United States Patent
Eitan et al.

(10) Patent No.: US 10,033,564 B2
(45) Date of Patent: Jul. 24, 2018

(54) FRAME FORMAT FOR FACILITATING CHANNEL ESTIMATION FOR SIGNALS TRANSMITTED VIA BONDED CHANNELS

(71) Applicant: QUALCOMM Incorporated, San Diego, CA (US)

(72) Inventors: Alecsander Eitan, Haifa (IL); Amichai Sanderovich, Atlit (IL); Gal Basson, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 15/214,255

(22) Filed: Jul. 19, 2016

(65) Prior Publication Data
US 2017/0033958 A1    Feb. 2, 2017

Related U.S. Application Data
(60) Provisional application No. 62/197,520, filed on Jul. 27, 2015.

(51) Int. Cl.
*H04L 27/26*    (2006.01)
*H04L 25/02*    (2006.01)

(52) U.S. Cl.
CPC ...... *H04L 27/2602* (2013.01); *H04L 25/0202* (2013.01); *H04L 27/2608* (2013.01)

(58) Field of Classification Search
None
See application file for complete search history.

(56) References Cited

U.S. PATENT DOCUMENTS

| | | | |
|---|---|---|---|
| 9,825,782 B2 * | 11/2017 | Eitan | |
| 2010/0061320 A1 | 3/2010 | Lakkis | |
| 2016/0128072 A1 * | 5/2016 | Rajagopal | H04L 27/2602 370/329 |
| 2016/0192363 A1 * | 6/2016 | Kasher | H04L 5/00 370/329 |
| 2016/0323755 A1 * | 11/2016 | Cordeiro | H04J 13/0014 |

FOREIGN PATENT DOCUMENTS

| | | |
|---|---|---|
| EP | 1622290 A1 | 2/2006 |
| WO | WO-2016094542 A2 | 6/2016 |

OTHER PUBLICATIONS

International Search Report and Written Opinion—PCT/US2016/043170—ISA/EPO—Sep. 26, 2016.

* cited by examiner

*Primary Examiner* — Mohammad S Adhami
(74) *Attorney, Agent, or Firm* — Loza & Loza, LLP/Qualcomm

(57) ABSTRACT

Certain aspects of the present disclosure provide an apparatus for wireless communications. The apparatus includes a processing system configured to generate a frame comprising a first channel estimation sequence for transmission via a first channel, a second channel estimation sequence for transmission via a second channel, and at least a first portion of a data payload for transmission via a third channel, wherein the first channel includes a first frequency band, wherein the second channel includes a second frequency band different from the first frequency band, and wherein the third channel includes a third frequency band that overlaps in frequency with the first and second frequency bands; and an interface configured to output the frame for transmission.

24 Claims, 19 Drawing Sheets

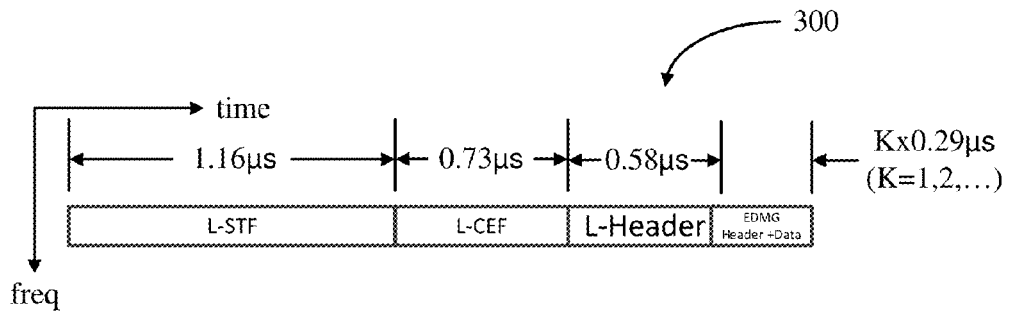

FIG. 3A

| Description | Bits | Notes |
|---|---|---|
| Payload data Length | 24 | |
| EDMG Header Number of LDPC blocks | 10 | Value is +1 (when this field is 0, it means 1 LDPC block) |
| Spatial streams | 4 | 1..16 |
| Channels | 3 | 1..8 |
| Channel Offset | 3 | 0..7 (The offset of this channel in the channel bonding) |
| 11ay MCS | 6 | |
| GI mode | 1 | Short or Long GI |
| FFT mode | 1 | Short or Long FFT |
| LDPC mode | 1 | Short (same as 11ad) or Long |
| Power difference | 4 | 0..15 dB |
| Reserved bits | 23 | |
| Proprietary bits | 8 | |
| CRC | 16 | |
| Total: | 104 | bits |

FIG. 3B

FRAME FORMAT FOR FACILITATING CHANNEL ESTIMATION FOR SIGNALS TRANSMITTED VIA BONDED CHANNELS

CROSS-REFERENCE TO RELATED APPLICATION

This application claims the benefit of the filing date of U.S. Provisional Application Ser. No. 62/197,520, filed on Jul. 27, 2015, and entitled "Frame Format for Facilitating Channel Estimation for Signals Transmitted via Bonded Channels," which is incorporated herein by reference.

FIELD

Certain aspects of the present disclosure generally relate to wireless communications and, more particularly, to transmitting and receiving frames including channel estimation sequences transmitted via separate frequency channels to facilitate decoding data transmitted via a bonded frequency channel which overlaps in frequency with the separate frequency channels.

BACKGROUND

A frame in accordance with the IEEE 802.11ad protocol includes a short training sequence, a channel estimation sequence, a header, and a data payload. In accordance with the 802.11ad protocol, the frame may be transmitted via a selected channel among a plurality of defined channels having adjacent non-overlapping frequency bands, respectively. The channel estimation sequence facilitates channel estimation at a receiver associated with the frequency band of the selected channel.

A new protocol, tentatively identified as IEEE 802.11ay, is being developed to increase data throughput through the use of a newly designed frame. The new frame is configured for transmitting data payload via a plurality of bonded channels. A bonded channel includes a frequency band that encompasses two or more adjacent frequency bands of the non-overlapping frequency bands of the channels defined in the 802.11ad. Accordingly, because a bonded channel has a wider bandwidth than the bandwidth of each of the channels defined in IEEE 802.11ad, the bonded channel is capable of facilitating the transmission of data at higher throughputs.

For a receiver to properly decode data transmitted via a bonded channel, the receiver needs to estimate of the channel response in the frequency range of the bonded channel. The new frames described herein facilitate a receiver determining or generating such channel estimation.

SUMMARY

Certain aspects of the present disclosure provide an apparatus for wireless communications. The apparatus comprises a processing system configured to generate a frame comprising a first channel estimation sequence for transmission via a first channel, a second channel estimation sequence for transmission via a second channel, and at least a first portion of a data payload for transmission via a third channel, wherein the first channel includes a first frequency band, wherein the second channel includes a second frequency band different from the first frequency band, and wherein the third channel includes a third frequency band that overlaps in frequency with the first and second frequency bands; and an interface configured to output the frame for transmission.

Certain aspects of the present disclosure provide a method for wireless communications. The method comprises generating a frame comprising a first channel estimation sequence for transmission via a first channel, a second channel estimation sequence for transmission via a second channel, and at least a first portion of a data payload for transmission via a third channel, wherein the first channel includes a first frequency band, wherein the second channel includes a second frequency band different from the first frequency band, and wherein the third channel includes a third frequency band that overlaps in frequency with the first and second frequency bands; and outputting the frame for transmission.

Certain aspects of the present disclosure provide an apparatus for wireless communications. The apparatus comprises means for generating a frame comprising a first channel estimation sequence for transmission via a first channel, a second channel estimation sequence for transmission via a second channel, and at least a first portion of a data payload for transmission via a third channel, wherein the first channel includes a first frequency band, wherein the second channel includes a second frequency band different from the first frequency band, and wherein the third channel includes a third frequency band that overlaps in frequency with the first and second frequency bands; and means for outputting the frame for transmission.

Certain aspects of the present disclosure provide a computer readable medium having instructions stored thereon for generating a frame comprising a first channel estimation sequence for transmission via a first channel, a second channel estimation sequence for transmission via a second channel, and at least a first portion of a data payload for transmission via a third channel, wherein the first channel includes a first frequency band, wherein the second channel includes a second frequency band different from the first frequency band, and wherein the third channel includes a third frequency band that overlaps in frequency with the first and second frequency bands; and outputting the frame for transmission.

Certain aspects of the present disclosure provide a wireless node. The wireless node comprises at least one antenna; a processing system configured to generate a frame comprising a first channel estimation sequence for transmission via a first channel, a second channel estimation sequence for transmission via a second channel, and at least a first portion of a data payload for transmission via a third channel, wherein the first channel includes a first frequency band, wherein the second channel includes a second frequency band different from the first frequency band, and wherein the third channel includes a third frequency band that overlaps in frequency with the first and second frequency bands; and an interface configured to output the frame for transmission by way of the at least one antenna.

Aspects of the present disclosure also provide various methods, means, and computer program products corresponding to the apparatuses and operations described above.

BRIEF DESCRIPTION OF THE DRAWINGS

FIG. 3A illustrates an exemplary frame or frame portion in accordance with certain aspects of the present disclosure.

FIG. 3B illustrates an exemplary Extended Directional Multigigabit (EDMG) Header in accordance with certain aspects of the present disclosure.

DETAILED DESCRIPTION

Figure 1:
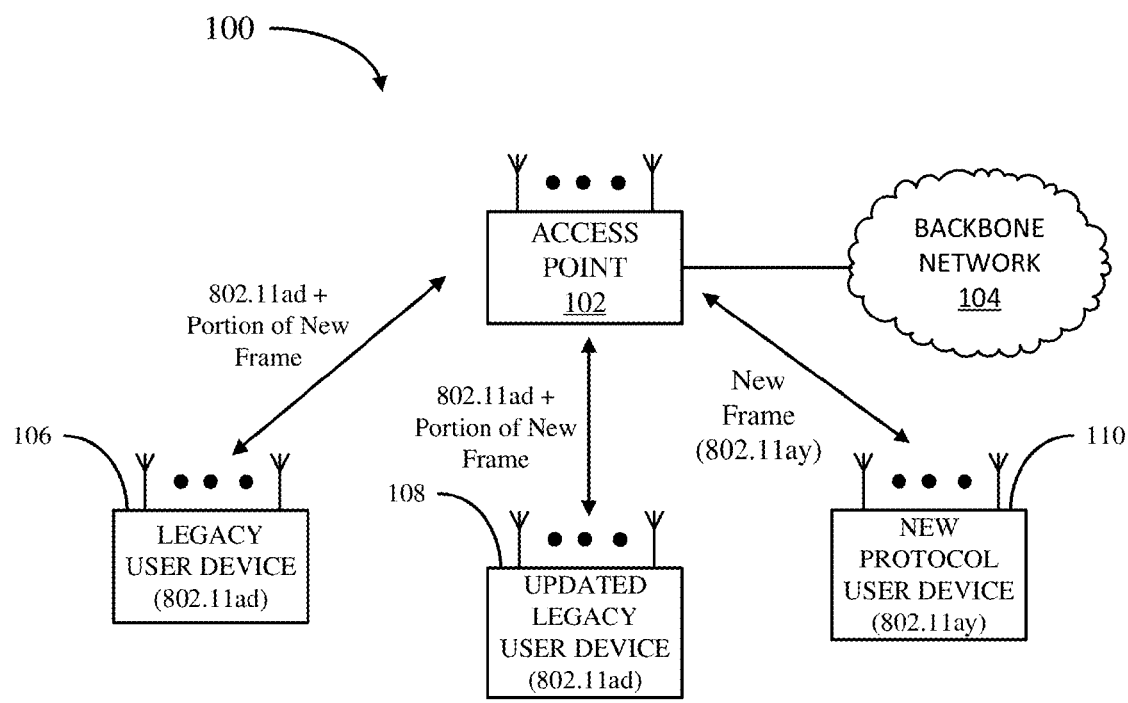
FIG. 1 is a diagram of an exemplary wireless communications network in accordance with certain aspects of the present disclosure.

Aspects of the present disclosure provide techniques for performing channel estimation of a bonded channel formed by bonding a plurality of channels by using channel estimation training sequences transmitted in each of the plurality of channels.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

With reference to the following description, it shall be understood that not only communications between access points and user devices are allowed, but also direct (e.g., peer-to-peer) communications between respective user devices are allowed. Furthermore, a device (e.g., an access point or user device) may change its behavior between a user device and an access point according to various conditions.

Also, one physical device may play multiple roles: user device and access point, multiple user devices, multiple access points, for example, on different channels, different time slots, or both.

FIG. 1 is a diagram of an exemplary wireless communications network 100 in accordance with certain aspects of the present disclosure. The communication network 100 comprises an access point 102, a backbone network 104, a legacy user device 106, an updated legacy user device 108, and a new protocol user device 110.

The access point 102, which may be configured for a wireless local area network (LAN) application, may facilitate data communications between the user devices 106, 108, and 110. The access point 102 may further facilitate data communications between devices coupled to the backbone network 104 and any one or more of the user devices 106, 108, and 110.

In this example, the access point 102 and the legacy user device 106 data communicate between each other using a legacy protocol. One example of a legacy protocol includes IEEE 802.11ad. According to this protocol, data communications between the access point 102 and the legacy user device 106 are effectuated via transmission of data frames that comply with the 802.11ad protocol. As discussed further herein, an 802.11ad data frame includes a preamble consisting of a legacy short training field (L-STF) and a legacy channel estimation sequence (L-CES) (now more commonly referred to as a legacy channel estimation field (L-CEF)), a legacy header (L-Header), a data payload, and an optional beamforming training field.

The L-STF sequence includes a plurality of Golay sequences ($Ga_{128}$) and a negative Golay sequence ($-Ga_{128}$) to signify the end of the L-STF sequence. The L-STF sequence may assist a receiver in setting up its automatic gain control (AGC), timing, and frequency setup for accurately receiving the rest of the frame and subsequent frames. In the case of a single carrier (SC) transmission mode, the L-CEF sequence includes a $Gu_{512}$ sequence (consisting of the following concatenated Golay sequences ($-Gb_{128}$, $-Ga_{128}$, $Gb_{128}$, $-Ga_{128}$) followed by a $Gv_{512}$ sequence (consisting of the following concatenated Golay sequences ($-Gb_{128}$, $Ga_{128}$, $-Gb_{128}$, $-Ga_{128}$), and ending with a $Gv_{128}$ (same as $-Gb_{128}$) sequence. In the case of an orthogonal frequency division multiplexing (OFDM) transmission mode, the L-CEF sequence includes a $Gv_{512}$ sequence followed by a $Gu_{512}$ sequence, and ending with a $Gv_{128}$ sequence. The L-CEF sequence assists the receiver in estimating the channel frequency response through which the frame is sent.

The L-Header includes various information about the frame. Such information includes a scrambler initiation field, which specifies a seed for the scrambling applied to the remainder of the L-Header and the data payload for data whitening purposes. The L-Header also includes the modulation and coding scheme (MCS) field to indicate one out of 12 defined MCS used for transmitting the data payload of the frame. The L-Header includes a length field to indicate the length of the data payload in octets. The L-Header further includes a training length field to indicate a length of the optional beam forming training sequence at the end of the frame. Additionally, the L-Header includes a packet type field to indicate whether the optional beam forming field pertains to transmission or reception. Further, the L-Header includes a header checksum (HCS) field to indicate a CRC-32 checksum over the header bits.

Referring again to FIG. 1, the legacy user device 106 is capable of decoding the entire 802.11ad data frame. The new frame disclosed herein, which may be subsequently adopted for the new standard or protocol 802.11ay, provides some backward compatibility feature. As discussed in more detail herein, the new frame includes the preamble (L-STF and L-CEF) and the L-Header of the 802.11ad, and one or more additional portions pertaining to the new protocol. Accordingly, the legacy user device 106 is configured to decode the 802.11ad preamble (L-STF and L-CEF) and L-Header portion of the new frame, but is not configured to decode the remaining portion of the new frame. The legacy user device 106 may decode the 802.11ad preamble and header portion of the new frame in order to calculate a network allocation vector (NAV) to determine the length of the new frame for transmission collision avoidance purposes.

The updated legacy user device 108 also operates under the legacy 802.11ad protocol, and is able to communicate with the access point 102 using 802.11ad data frames. However, the frame processing capability of the updated legacy user device 108 has been updated to interpret certain bits in the L-Header of the new frame that indicate an attribute of the new frame, as discussed further herein. In accordance with the legacy 802.11ad protocol, these bits are allocated to least significant bits (LSB) of the data length in the L-Header. But, in accordance with the new frame, the otherwise allocated bits of the L-Header are used to indicate a transmission power difference between a first portion of the new frame and a second portion of the new frame in accordance with a certain transmission mode associated with the new frame. These bits allow the updated legacy user device to anticipate the power difference (an increase) for signal interference management purposes. Although, in this example, the allocation of the LSB length bits signifies the aforementioned power difference, it shall be understood that these bits may be allocated for other purposes.

The new protocol user device 110 is capable of communicating with the access point 102 using the new data frame, which some or all features of the new frame may be adopted for the 802.11ay protocol. As discussed further herein, the new data frame includes the legacy 802.11ad preamble (L-STF and L-CEF) and L-Header, with the L-Header slightly modified to indicate the transmission mode associated with the new frame and, as previously discussed, a transmission power difference between a first portion of the new frame and a second portion of the new frame. The slight modification to the L-Header of the new frame does not impact the decoding of the L-Header by the legacy user device 106 and the updated legacy user device 108. The bits in the L-Header of the new frame that indicate the transmission mode are reserved bits in the standard 802.11ad legacy header.

In addition to the legacy preamble (L-STF and L-CEF) and L-Header, the new frame further comprises an Extended Directional Multigigabit (EDMG) Header. As discussed in more detail herein, the EDMG Header comprises a plurality of fields for indicating various attributes of the new frame. Such attributes includes payload data length, number of low density parity check (LDPC) data blocks in the EDMG Header, the number of spatial streams supported, the number of bonded channels, the leftmost (lowest frequency) channel of the bonded channels, the MCS used for the data payload of the new frame, the transmit power difference between different portions of the frame, and other information. The EDMG Header may further be appended with payload data that is not in the data payload portion (now more commonly referred to as the EDMG data payload) of the new frame. For short messages, all of the payload data may appended to the EDMG Header, thereby avoiding the need for transmitting the "separate" EDMG data payload of the new frame, which adds significant overhead to the frame.

The new data frame is configured to provide additional features to improve data throughput by employing higher data modulation schemes, channel bonding, channel aggregation, and improved spatial transmission via multiple input multiple output (MIMO) antenna configurations. For instance, the legacy 802.11ad protocol includes BPSK, QPSK, and 16QAM available modulation schemes. According to the new protocol, higher modulation schemes, such as 64QAM, 64APSK, 128APSK, 256QAM, and 256APSK are available. Additionally, a plurality of channels may be bonded or aggregated to increase data throughput. Further, such bonded or aggregated channels may be transmitted by way of a plurality of spatial transmissions using a MIMO antenna configuration.

Figure 2:
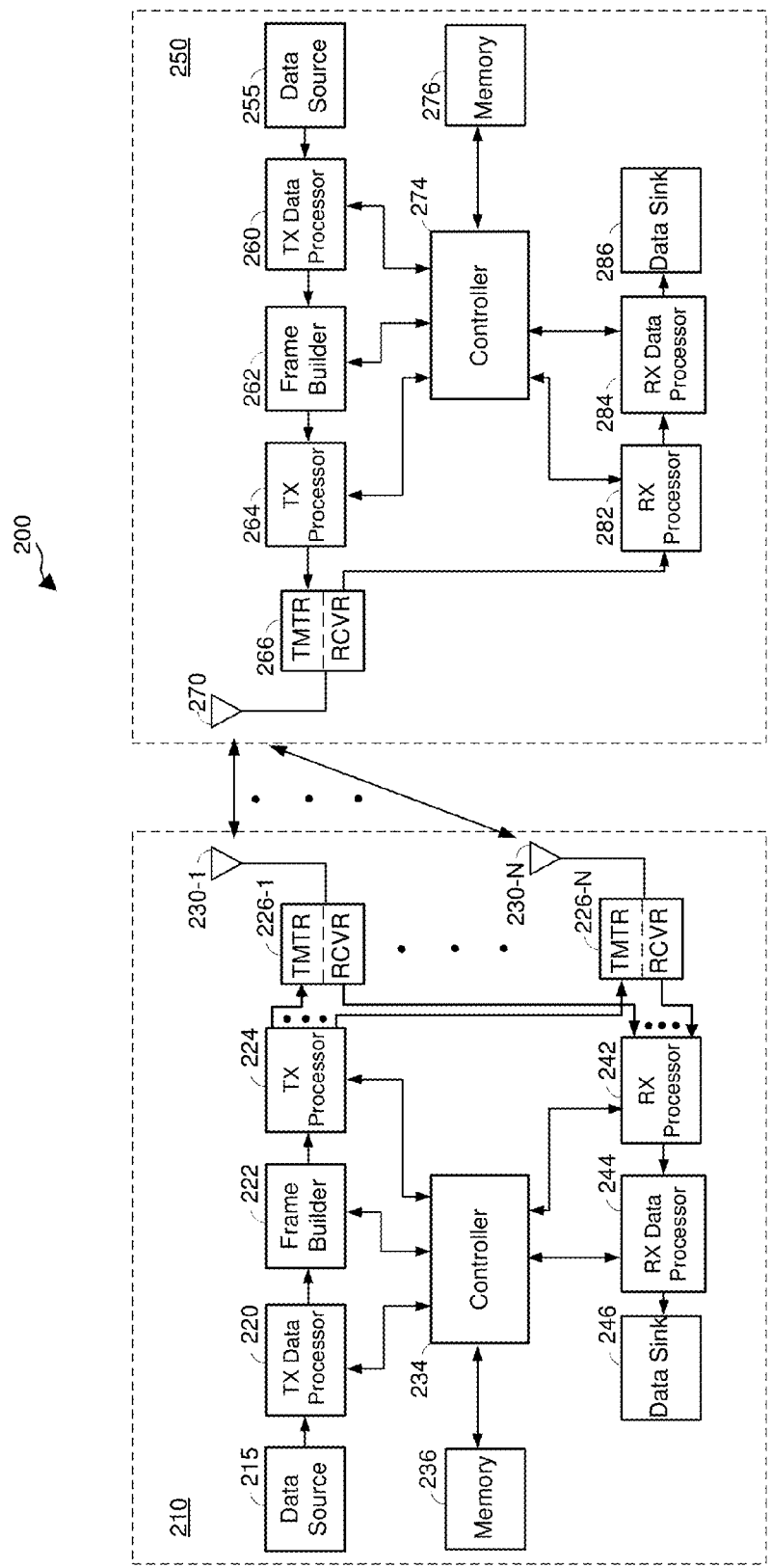
FIG. 2 is a block diagram of an exemplary pair of wireless nodes in communication with each other in accordance with certain aspects of the present disclosure.

FIG. 2 illustrates a block diagram of an exemplary access point 210 (generally, a first wireless node) and an exemplary access terminal 250 (generally, a second wireless node) of a wireless communication system 200. The access point 210 is a transmitting entity for the downlink and a receiving entity for the uplink. The access terminal 250 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel.

Although, in this example, device 210 is an access point and device 250 is an access terminal, it shall be understood that the device 210 may alternatively be an access terminal, and device 250 may alternatively be an access point.

For transmitting data, the access point 210 comprises a transmit data processor 220, a frame builder 222, a transmit processor 224, a plurality of transceivers 226-1 to 226-N, and a plurality of antennas 230-1 to 230-N. The access point 210 also comprises a controller 234 for controlling operations of the access point 210.

In operation, the transmit data processor 220 receives data (e.g., data bits) from a data source 215, and processes the data for transmission. For example, the transmit data processor 220 may encode the data (e.g., data bits) into encoded data, and modulate the encoded data into data symbols. The transmit data processor 220 may support different modulation and coding schemes (MCSs). For example, the transmit data processor 220 may encode data (e.g., using low-density parity check (LDPC) encoding) at any one of a plurality of different coding rates. Also, the transmit data processor 220 may modulate the encoded data using any one of a plurality of different modulation schemes, including, but not limited to, BPSK, QPSK, 16QAM, 64QAM, 64APSK, 128APSK, 256QAM, and 256APSK.

In certain aspects, the controller 234 may send a command to the transmit data processor 220 specifying which modulation and coding scheme (MCS) to use (e.g., based on channel conditions of the downlink), and the transmit data processor 220 may encode and modulate data from the data source 215 according to the specified MCS. It is to be appreciated that the transmit data processor 220 may perform additional processing on the data such as data scrambling, and/or other processing. The transmit data processor 220 outputs the data symbols to the frame builder 222.

The frame builder 222 constructs a frame (also referred to as a packet), and inserts the data symbols into a data payload of the frame. The frame may include a preamble, an L-Header, and the data payload. The preamble may include a short training field (L-STF) sequence and a channel estimation field (L-CEF) to assist the access terminal 250 in receiving the frame. The L-Header may include information related to the data in the payload such as the length of the data and the MCS used to encode and modulate the data. This information allows the access terminal 250 to demodulate and decode the data. The data in the payload may be divided among a plurality of blocks, wherein each block may include a portion of the data and a guard interval (GI) to assist the receiver with phase tracking. The frame builder 222 outputs the frame to the transmit processor 224.

The transmit processor 224 processes the frame for transmission on the downlink. For example, the transmit processor 224 may support different transmission modes such as an orthogonal frequency-division multiplexing (OFDM) transmission mode and a single-carrier (SC) transmission mode. In this example, the controller 234 may send a command to the transmit processor 224 specifying which transmission mode to use, and the transmit processor 224 may process the frame for transmission according to the specified transmission mode. The transmit processor 224 may apply a spectrum mask to the frame so that the frequency constituent of the downlink signal meets certain spectral requirements.

In certain aspects, the transmit processor 224 may support multiple-output-multiple-input (MIMO) transmission. In these aspects, the access point 210 may include multiple antennas 230-1 to 230-N and multiple transceivers 226-1 to 226-N (e.g., one for each antenna). The transmit processor 224 may perform spatial processing on the incoming frames and provide a plurality of transmit frame streams for the plurality of antennas. The transceivers 226-1 to 226-N receive and processes (e.g., converts to analog, amplifies, filters, and frequency upconverts) the respective transmit frame streams to generate transmit signals for transmission via the antennas 230-1 to 230-N, respectively.

For transmitting data, the access terminal 250 comprises a transmit data processor 260, a frame builder 262, a transmit processor 264, a transceiver 266, and one or more antennas 270 (for simplicity one antenna is shown). The access terminal 250 may transmit data to the access point 210 on the uplink, and/or transmit data to another access terminal (e.g., for peer-to-peer communication). The access terminal 250 also comprises a controller 274 for controlling operations of the access terminal 250.

In operation, the transmit data processor 260 receives data (e.g., data bits) from a data source 255, and processes (e.g., encodes and modulates) the data for transmission. The transmit data processor 260 may support different MCSs. For example, the transmit data processor 260 may encode the data (e.g., using LDPC encoding) at any one of a plurality of different coding rates, and modulate the encoded data using any one of a plurality of different modulation schemes, including, but not limited to, BPSK, QPSK, 16QAM, 64QAM, 64APSK, 128APSK, 256QAM, and 256APSK. In certain aspects, the controller 274 may send a command to the transmit data processor 260 specifying which MCS to use (e.g., based on channel conditions of the uplink), and the transmit data processor 260 may encode and modulate data from the data source 255 according to the specified MCS. It is to be appreciated that the transmit data processor 260 may perform additional processing on the data. The transmit data processor 260 outputs the data symbols to the frame builder 262.

The frame builder 262 constructs a frame, and inserts the received data symbols into a data payload of the frame. The frame may include a preamble, header, and the data payload. The preamble may include an L-STF sequence and an L-CEF sequence to assist the access point 210 and/or other access terminal in receiving the frame. The header may include information related to the data in the payload such as the length of the data and the MCS used to encode and modulate the data. The data in the payload may be divided among a plurality of blocks where each block may include a portion of the data and a guard interval (GI) assisting the access point and/or other access terminal with phase tracking. The frame builder 262 outputs the frame to the transmit processor 264.

The transmit processor 264 processes the frame for transmission. For example, the transmit processor 264 may support different transmission modes such as an OFDM transmission mode and an SC transmission mode. In this example, the controller 274 may send a command to the transmit processor 264 specifying which transmission mode to use, and the transmit processor 264 may process the frame for transmission according to the specified transmission mode. The transmit processor 264 may apply a spectrum mask to the frame so that the frequency constituent of the uplink signal meets certain spectral requirements.

The transceiver 266 receives and processes (e.g., converts to analog, amplifies, filters, and frequency upconverts) the output of the transmit processor 264 for transmission via the one or more antennas 270. For example, the transceiver 266 may upconvert the output of the transmit processor 264 to a transmit signal having a frequency in the 60 GHz range.

In certain aspects, the transmit processor 264 may support multiple-output-multiple-input (MIMO) transmission. In these aspects, the access terminal 250 may include multiple antennas and multiple transceivers (e.g., one for each antenna). The transmit processor 264 may perform spatial processing on the incoming frame and provide a plurality of transmit frame streams for the plurality of antennas. The transceivers receive and processes (e.g., converts to analog, amplifies, filters, and frequency upconverts) the respective transmit frame streams to generate transmit signals for transmission via the antennas.

For receiving data, the access point 210 comprises a receive processor 242, and a receive data processor 244. In operation, the transceivers 226-1 to 226-N receive a signal (e.g., from the access terminal 250), and spatially process (e.g., frequency downconverts, amplifies, filters and converts to digital) the received signal.

The receive processor 242 receives the outputs of the transceivers 226-1 to 226-N, and processes the outputs to recover data symbols. For example, the access point 210 may receive data (e.g., from the access terminal 250) in a frame. In this example, the receive processor 242 may detect the start of the frame using the L-STF sequence in the preamble of the frame. The receive processor 242 may also use the L-STF for automatic gain control (AGC) adjustment. The receive processor 242 may also perform channel estimation (e.g., using the L-CEF sequence in the preamble of the frame) and perform channel equalization on the received signal based on the channel estimation.

Further, the receive processor 242 may estimate phase noise using the guard intervals (GIs) in the payload, and reduce the phase noise in the received signal based on the estimated phase noise. The phase noise may be due to noise from a local oscillator in the access terminal 250 and/or noise from a local oscillator in the access point 210 used for frequency conversion. The phase noise may also include noise from the channel. The receive processor 242 may also recover information (e.g., MCS scheme) from the header of the frame, and send the information to the controller 234. After performing channel equalization and/or phase noise reduction, the receive processor 242 may recover data symbols from the frame, and output the recovered data symbols to the receive data processor 244 for further processing.

The receive data processor 244 receives the data symbols from the receive processor 242 and an indication of the corresponding MSC scheme from the controller 234. The receive data processor 244 demodulates and decodes the data symbols to recover the data according to the indicated MSC scheme, and outputs the recovered data (e.g., data bits) to a data sink 246 for storage and/or further processing.

As discussed above, the access terminal 250 may transmit data using an OFDM transmission mode or a SC transmission mode. In this case, the receive processor 242 may process the receive signal according to the selected transmission mode. Also, as discussed above, the transmit processor 264 may support multiple-output-multiple-input (MIMO) transmission. In this case, the access point 210 includes multiple antennas 230-1 to 230-N and multiple transceivers 226-1 to 226-N (e.g., one for each antenna). Each transceiver receives and processes (e.g., frequency downconverts, amplifies, filters, and converts to digital) the signal from the respective antenna. The receive processor 242 may perform spatial processing on the outputs of the transceivers 226-1 to 226-N to recover the data symbols.

For receiving data, the access terminal 250 comprises a receive processor 282, and a receive data processor 284. In operation, the transceiver 266 receives a signal (e.g., from the access point 210 or another access terminal), and processes (e.g., frequency downconverts, amplifies, filters and converts to digital) the received signal.

The receive processor 282 receives the output of the transceiver 266, and processes the output to recover data symbols. For example, the access terminal 250 may receive data (e.g., from the access point 210 or another access terminal) in a frame, as discussed above. In this example, the receive processor 282 may detect the start of the frame using the L-STF sequence in the preamble of the frame. The receive processor 282 may also perform channel estimation (e.g., using the L-CEF sequence in the preamble of the frame) and perform channel equalization on the received signal based on the channel estimation.

Further, the receive processor 282 may estimate phase noise using the guard intervals (GIs) in the payload, and reduce the phase noise in the received signal based on the estimated phase noise. The receive processor 282 may also recover information (e.g., MCS scheme) from the header of the frame, and send the information to the controller 274. After performing channel equalization and/or phase noise reduction, the receive processor 282 may recover data symbols from the frame, and output the recovered data symbols to the receive data processor 284 for further processing.

The receive data processor 284 receives the data symbols from the receive processor 282 and an indication of the corresponding MSC scheme from the controller 274. The receiver data processor 284 demodulates and decodes the data symbols to recover the data according to the indicated MSC scheme, and outputs the recovered data (e.g., data bits) to a data sink 286 for storage and/or further processing.

As discussed above, the access point 210 or another access terminal may transmit data using an OFDM transmission mode or a SC transmission mode. In this case, the receive processor 282 may process the receive signal according to the selected transmission mode. Also, as discussed above, the transmit processor 224 may support multiple-output-multiple-input (MIMO) transmission. In this case, the access terminal 250 may include multiple antennas and multiple transceivers (e.g., one for each antenna). Each transceiver receives and processes (e.g., frequency downconverts, amplifies, filters, converts to digital) the signal from the respective antenna. The receive processor 282 may perform spatial processing on the outputs of the transceivers to recover the data symbols.

As shown in FIG. 2, the access point 210 also comprises a memory 236 coupled to the controller 234. The memory 236 may store instructions that, when executed by the controller 234, cause the controller 234 to perform one or more of the operations described herein. Similarly, the access terminal 250 also comprises a memory 276 coupled to the controller 274. The memory 276 may store instructions that, when executed by the controller 274, cause the controller 274 to perform the one or more of the operations described herein.

Frame Format Common to the Enhanced Frames

FIG. 3A illustrates an exemplary frame or frame portion 300 in accordance with another aspect of the disclosure. As described herein, all of the suggested frame formats include legacy fields: L-STF+L-CEF+L-Header. After the legacy fields, the transmission includes various fields that are part of the new 802.11ay protocol or formats. According to the new protocol, several transmission options may be used: orthogonal frequency division multiplexing (OFDM), single carrier wideband (SC WB), single carrier (SC) Aggregate, and each one has various options and formats. All the aforementioned 802.11ay options include an EDMG Header with optional data.

Legacy fields, indicated herein with the L- prefix, are decodable by devices operating under the 802.11ad, updated 802.11ad, and 802.11ay protocols. Non-legacy fields, such as 802.11ay fields, indicated herein with the EDMG prefix, are decodable by devices operating under the 802.11ay protocol, but not devices operating under the 802.11ad protocol.

As shown, according to the new frame or frame portion 300, the L-STF may have a duration of substantially 1.16 microseconds (μs), the L-CEF may have a duration of substantially 0.73 μs, the L-Header may have a duration of substantially 0.58 μs, and the EDMG Header may have a duration of substantially 0.29 μs or an integer K multiple thereof. In the case that the frame 300 is a full frame (not a frame portion), the frame 300 may be transmitted via a single channel and include data payload in the EDMG Header. Such configuration may be useful for short messages because there is no need for a separate data payload according to the new frame format, which may consume overhead for the transmission.

The L-Header specifies various parameters and it is decoded by all stations (user devices and access points) that are in range. These stations listen when they are waiting for receiving a message or prior to transmission. The L-Header specifies the modulation coding scheme (MCS) used in the legacy data transmission and the amount of data that is transmitted. Stations use these two values to compute the duration length to update the network allocation vector (NAV). This is a mechanism that allows stations to know that the medium is going to be used by a transmitter, even if they cannot decode the data itself, or even if they are not the intended receiver of the message. The use of NAV is one of the mechanisms to avoid transmitted signal collisions.

In the legacy 802.11ad frame format (for data), data is placed in low density parity check (LDPC) blocks, where the size is according to the code rate, then encoded to a fixed length (672 bits). The outcome is concatenated and then split into Fast Fourier Transform (FFT) blocks according to the selected MCS (mainly modulation). At a receiver, the process is reversed. It should be noted that in low data MCSs, one LDPC block may require one or more FFT blocks, while in high data MCSs, one FFT block may host more than one LDPC blocks. This discussion is relevant to the placing of LDPC data immediately after the EDMG Header, as described in more detail herein.

FIG. 3B illustrates an exemplary EDMG Header 350 of the frame or frame portion 300 in accordance with certain aspects of the present disclosure. The EDMG Header 350 specifies the transmission frame parameters (MCS, Data length, modes, etc.) that are used by a receiver to be able to receive and decode the transmission frame. There is no need for other stations (not the destination station) to demodulate the EDMG Header 350. Hence, the EDMG Header 350 and optional attached data can be transmitted at high MCS that is suitable for the destination station.

The EDMG Header 350 comprises: (1) a Payload data Length field including 24 bits to specify the length of the new protocol 802.11ay payload data in octets in all concurrent channels, regardless of whether the payload data is appended to the EDMG Header or in the separate payload portion; (2) an EDMG Header Number of LDPC blocks field including 10 bits to specify the number of LDPC data blocks in the EDMG Header and data. When this value is zero (0), it means there is one (1) LDPC block of data in the EDMG Header; (3) a Spatial streams field including 4 bits to represent the number (e.g., 1 to 16) of spatial streams that are transmitted; (4) a Channels field including 3 bits to specify the number of bonded channels (e.g., 1 to 8 802.11ad channels, as well as additional channels not available in 802.11ad); and (5) a Channel offset field including 3 bits to specify the offset of the first channel of the bonded channels. In this example, the first channel is the left-most (lowest frequency) channel among the bonded channels. This value is set to zero (0) when the first channel is the lowest frequency channel among all the available channels, or when only one channel is used (i.e., no channel bonding).

The EDMG Header 350 further comprises: (6) an 11ay MCS field including 6 bits to specify the MCS used in the EDMG (aka, NG60 and 802.11 ay) payload transmission. Note that the short data attached to EDMG Header uses the legacy 802.11ad MCS. The 802.11ay MCS may include higher throughput modulation schemes beyond those available in 802.11ad, such as 64QAM, 64APSK, 256QAM, and 256 APSK; (7) a GI (Guard Interval) mode field including one bit to indicate short or long GI. Note that the actual values may be dependent on parameters, such as the number of bonded channels; (8) an FFT mode field including one bit to indicate short or long FFT block. Note that the actual values may be dependent on parameters, such as the number of bonded channels; and (9) an LDPC mode field including 1 bit to indicate short or long LDPC block.

The EDMG Header 350 further comprises: (10) a Power difference field including 4 bits to signal a difference in average power between the aggregated power of the legacy portion and EDMG Header of the new frame (e.g., L-STF+ L-CEF+L-Header+EDMG Header/Data) and the SC WB mode transmission of the EDMG part (optional EDMG STF+optional EDMG CEF+EDMG Payload). This difference may be vendor specific. Some transmitters may need power backoff between the aggregated section and the WB section due to PA non-linearity. This value informs the receiver about the expected power difference to assist in AGC setup. The value is coded in dB (e.g., 0000: 0 dB, 0100: 4 dB, 1111: 15 dB or above).

The EDMG Header 350 further comprises: (11) Reserved bits, that is, 23 bits that are reserved at this time. Transmitters should set them to 0 at this time. In the future, these bits may be allocated to various needs; (12) Proprietary bits, that is, 8 spare bits that may be used by vendors and do not require interoperability. Receivers should discard these bits unless they know what they are; and (13) a CRC field including 16 bits to sign the EDMG Header. This field is to be used by a receiver to validate the correctness of the received EDMG Header. All bits (except the CRC) shall be used to compute the CRC.

The EDMG Header 350 may be sent on each concurrently-transmitted channel with exactly the same content. This duplication may be used by a receiver to increase the correct detection probability. A receiver may use different algorithms: Option 1: receiver decodes only one channel (simples but lowest performance); Option 2: receiver decodes only one channel at the time. If CRC passes, then the receiver may cease CRC processing for additional channel(s), if it has not attempted CRC processing for additional channel(s). Option 2 may be better at performance than Option 1, but requires serial processing; and Option 3: receiver decodes all channels and selects one that has the corrected CRC. Option 3 may have the same performance as Option 2, but is faster.

Data Attached to the EDMG Header

Receivers, according to the new protocol NG60 (802.11ay), need, from a practical aspect, decode the EDMG Header before samples for the optional EDMG STF, optional EDMG CEF, and EDMG data payload can be received. The reason is that the receiver may need to perform some adjustments. For instance, in SC WB transmission mode, the optional EDMG STF is transmitted in single carrier wideband (SC WB) mode and the receiver front-end needs to be re-configured with new filters and other parameters. The use of the 802.11ay modulations require some overhead to be used in some cases (e.g., for processing the optional EDMG STF and/or optional EDMG CEF). This overhead reduces the efficiency especially in short messages.

Efficient support of the above lead us to suggest to: (1) Use the "spare" period following the EDMG Header to start to transmit the data; (2) Extend the Data following the EDMG Header to at least 2 LDPC blocks and 2 FFT blocks before modulation is changed to 11ay set (including the optional EDMG STF and/or EDMG CEF); and optionally extend the Data following the EDMG Header beyond the minimum (specified above) for improving efficiency for short payloads.

EDMG Header may be sent on each 60 GHz channel used for any transmission, using the legacy 802.11ad MCS specified in the L-Header. The EDMG Header may be followed by Data (if Data is to be sent). The Data following the EDMG Header may be split over all used channels.

If 802.11ay modulations are used in the transmission, then the EDMG Header and attached Data should occupy at least two FFT blocks and at least two LDPC blocks (all this is using the legacy MCS). All LDPC blocks may be fully populated in the EDMG Header. Transmitter may extend this portion to more LDPC blocks, up to 1024 blocks (per channel, all channels use same legacy MCS). The Length of the data attached to the EDMG Header is according to the number of LDPC blocks (specified in the EDMG Header Number of LDPC blocks field in the EDMG Header per channel) multiplied by number of channels, and amount of bits per LDPC blocks. The length of data in the EDMG data payload field is the rest of the data according to the Length specified in the EDMG Header.

If 802.11ay modulation is not used in the transmission (e.g., in a short message application), then the EDMG Header and attached Data (if data is to be sent) should occupy at least one FFT block and at least one LDPC block (all this using the legacy MCS). The data should fill the LDPC blocks starting from lowest channel index (e.g., the LDPC block of the lowest-frequency channel is filled first, then the LDPC block of the second lowest-frequency channel is filled, and so on). The Length specified in the EDMG Header refers to the actual data that is transmitted following the EDMG Header when no 802.11ay modulation is used.

The transmitter may select more numbers of LDPC blocks in order to optimize the transmission for short packets (avoiding the EDMG optional sections STF and CEF overhead). Receiver should compare the data length from these LDPC blocks with the Data Length in the EDMG Header to deduce if there is a 802.11ay section at all and if yes, to compute the exact amount of data in the EDMG data payload section alone. Note that the LDPC blocks including the EDMG Header and data are fully populated with data if the 802.11ay data payload exists.

The FFT block(s) and LDPC block(s) are per channel. The payload data following the EDMG Header is split between the channels evenly starting from lowest channel in a round-robin manner per byte. If the data cannot be confined in the portion attached to the EDMG Header, then this portion will be completely filled before data is sent via EDMG data payload section. The data length in the EDMG Header specifies the actual number of octets, regardless of where they are located.

The following provides a few non-limiting examples regarding the amount of data available in the data section attached to the EDMG Header for 2 LDPC blocks or 2 FFT blocks:

Case 1: 1 channel & legacy MCS-1 (this is the case of the least data). In MCS-1, two LDPC blocks may be used. These two blocks host 336 bits and will take three FFT blocks to be transmitted. In this example, the information fields in the EDMG Header occupy 104 bits. Thus, the payload data attached to the EDMG Header is 232 bits (29 bytes) (i.e., 336 bits-104 bits).

Case 2: 4 channels and legacy MCS-12 (this is the case of the most data). In MCS-12, two FFT blocks host 3584 coded bits per channel that can host 5 LDPC blocks. At this code rate, there are 2520 bits in the 5 LDPC blocks, out of which 104 field bits will be used for Extended Header. This leaves 2416 bits for payload data in the EDMG Header per channel. Hence, in this case, a total of 1214 payload bytes of data may be transmitted via the EDMG Header of the 4 channels.

Case 3: 2 channels and legacy MCS-8 (an intermediate data amount case). In MCS-8, two FFT blocks host 1792 coded bits per channel that can hold 2 LDPC blocks. In the two LDPC blocks, there are 1008 bits, out of which 104 are dedicated to the information fields of the EDMG Header. This leaves a total of 904 bits for payload data in the EDMG Header of each channel. For the two channel case, a total of 228 bytes of payload data in the EDMG Headers may be transmitted.

L-Header Change to Indicate Transmission Mode

Bits 44 to 46, which are reserved bits in the 802.11ad header, may be used in the L-Header portion of the new protocol 802.11ay frame to signal transmission mode for the 802.11ay new protocol. For example, the L-Header indicates this as a 802.11ay mode by setting three (3) bits to any value other than all zeros. Example of the bits value and corresponding modes are indicated in the following table:

| Bits | Mode |
|------|------|
| 000 | 802.11ad (legacy mode) |
| 001 | SC-WB |
| 010 | SC-Aggregate |
| 011 | SC-Duplicate |
| 100 | OFDM |
| Other | Reserved |

Frame Format for OFDM with L-CEF and CEF-GF Transmitted Simultaneously

FIGS. 4A-4D illustrate exemplary frames 400, 420, 440, and 460 for transmission via an orthogonal frequency division multiplexing (OFDM) transmission mode in accordance with an aspect of the disclosure. The OFDM frame format is configured to maintain the legacy 802.11ad preamble (L-STF and L-CEF) and L-Header as prefix in order to be backwards compliant. In addition, OFDM frames may be transmitted with some backoff to reduce peak to average power ratio (PARP), which needs to be applied to the legacy preambles themselves. In all of the frame diagrams, the vertical or y-axis represents frequency and the horizontal or x-axis represents time.

Figure 4A:
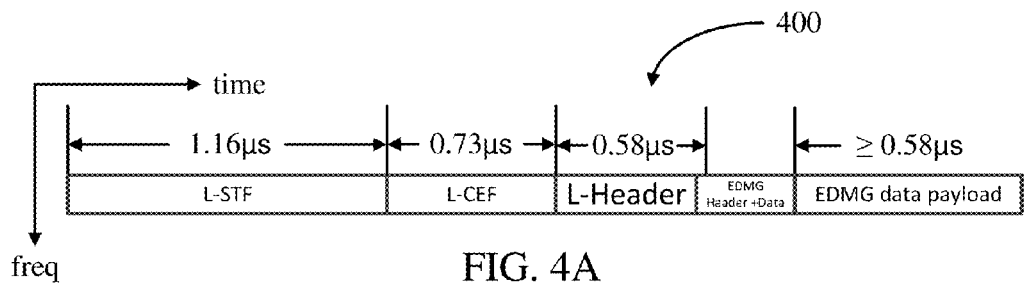
FIGS. 4A-4D illustrate a set of exemplary frames for transmission of data via an orthogonal frequency division multiplexing (OFDM) transmission in accordance with certain aspects of the present disclosure.

More specifically, with reference to FIG. 4A, frame 400 is an example of a single-channel OFDM frame including an L-STF, an L-CEF, an L-Header, an EDMG Header with optional attached data, and an EDMG data payload. The bandwidth of the single-channel may be substantially 1.76 GHz. As previously discussed, the duration or length of the L-STF, L-CEF, L-Header, and EDMG Header with optional attached data may be substantially 1.16 μs, 0.73 μs, 0.58 μs, and ÷0.58 μs, such as an integer K multiple of 0.58 μs. As illustrated, the L-STF, L-CEF, L-Header, EDMG Header, and EDMG data payload may be transmitted in such order without time gaps between each of the frame portions.

Figure 4B:
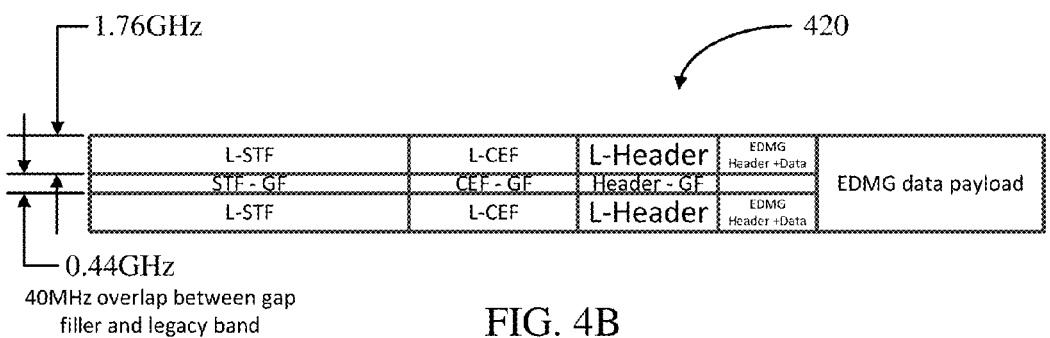
Figure 4C:
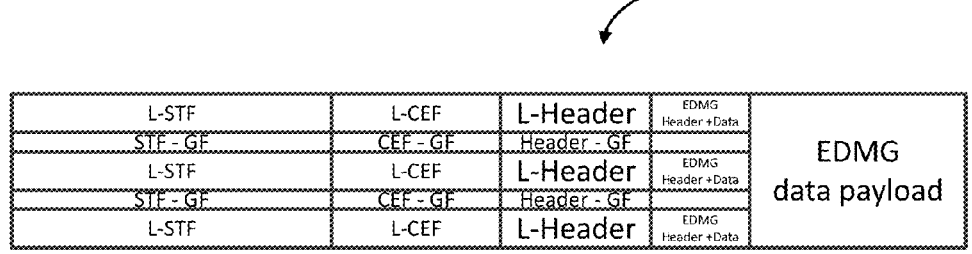
Figure 4D:
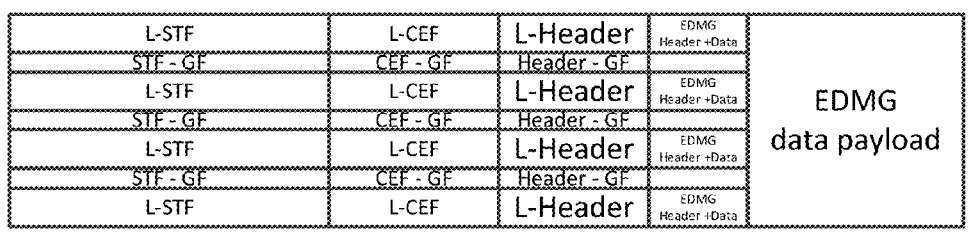

With reference to FIG. 4B, frame 420 is an example of a two bonded channel OFDM frame in accordance with the new protocol (802.11ay). The frame 420 comprises a first (lower frequency) channel (upper channel as shown) for transmitting the legacy preamble (L-STF and L-CEF), the L-Header, and the EDMG Header with the optional attached data. The first channel may have a bandwidth of substantially 1.76 GHz. The frame 420 further comprises a second (upper frequency) channel (lower channel as shown) for transmitting the legacy preamble (L-STF and L-CEF), L-Header, and the EDMG Header. The transmission of the L-STF, L-CEF, and L-Header in the first and second channels are for 802.11ad backward compatibility. The data attached to the EDMG Header for the first channel may be different than the data attached to the EDMG Header of the second channel. The second channel also has a bandwidth of substantially 1.76 GHz. The first channel includes a frequency band that is spaced apart in frequency from the frequency band of the second channel.

Additionally, the frame 420 comprises a gap filling (GF) channel having a frequency band situated in frequency between the first and second frequency bands of the first and second channels. The GF channel may have a bandwidth of substantially 440 MHz (0.44 GHz). Since the total bandwidth for the transmission is 3.92 GHz, the high frequency portion of the first channel may overlap with the low frequency portion of the GF channel by 20 MHz. Similarly, the high frequency portion of the GF channel may overlap with the low frequency portion of the second channel by 20 MHz. However, as discussed in more detail below, a channel estimation field portion of the GF channel may be narrowed by filtering to substantially minimize the overlap between the first channel and the GF channel, and between the second channel and the GF channel.

The GF channel comprises a short training field (STF-GF), a channel estimation field (CEF-GF), and an optional header (Header-GF). The L-STF of the first channel, the STF-GF of the GF channel, and the L-STF of the second channel are transmitted in a substantially time aligned manner That is, the first channel L-STF, the STF-GF, and the second channel L-STF may have substantially the same length or duration, and they are transmitted at substantially the same time. In other words, the transmission of the beginning and end of the first channel L-STF, the STF-GF, and the second channel L-STF are substantially time aligned. The STF-GF may be also based on Golay sequences, and may be also configured substantially the same or similar to the Golay sequences of the first and second channel L-STF. The L-STF of the first and second channels and the STF-GF of the GF channel may be used collectively by a receiver for AGC (power) adjustment and/or other purposes.

Similarly, the L-CEF of the first channel, the CEF-GF of the GF channel, and the L-CEF of the second channel are transmitted in a substantially time aligned manner That is, the first channel L-CEF, the CEF-GF, and the second channel L-CEF may have substantially the same length or duration, and they are transmitted at substantially the same time. In other words, the transmission of the beginning and end of the first channel L-CEF, the CEF-GF, and the second channel L-CEF are substantially time aligned.

The CEF-GF may be also based on Golay sequences. The sequences may also be modulated using BPSK modulation, as it is done in the L-CEF in accordance with 802.11ad. There may be three (3) options for implementing the CEF-GF based on Golay sequences. A first option is for the CEF-GF to be based on Golay sequences, each having a length of 32 symbols. For example, the sequences may be the same as the sequences defined in the 802.11ad standard, Table 21-28, reproduced below:

TABLE 21-28

The sequence Ga32(n)
The Sequence Ga32(n), to be transmitted from left to right

| +1 | +1 | +1 | +1 | +1 | −1 | +1 | −1 | −1 | −1 | +1 | +1 | +1 | −1 | −1 | +1 |
| +1 | +1 | −1 | −1 | +1 | −1 | −1 | +1 | −1 | −1 | −1 | −1 | +1 | −1 | +1 | −1 |

A second option is for the CEF-GF to be based on Golay sequences, each having a length of 20 symbols. There are various options for building Golay sequences of length 20. For instance, Golay sequences of length 20 may be built from the following seeds of length 10:

Seed "a": [+1 +1 −1 +1 −1 +1 −1 −1 +1 +1] and Seed "b": [+1 +1 −1 +1 +1 +1 +1 +1 −1 −1]; or Seed "a": [+1 +1 +1 +1 +1 −1 +1 −1 −1 +1] and Seed "b": [+1 +1 −1 −1 +1 +1 +1 −1 +1 −1]

The seeds may be turned into Golay sequence of length 20 using an [a, b] or [a, −b] construction. Alternatively, the Golay sequences may be based on a Golay sequence of length 20 as follows:

Golay 20: [+1 +1 +1 +1 +1 −1 −1 +1 +1 −1 −1 +1 +1 −1 +1 −1 −1 +1]; or

Golay 20: [1 +1 +1 +1 +1 +1 +1 +1 +1 −1 −1 −1 +1 −1 +1 −1 +1 +1 −1]

A third option is for the CEF-GF to be based on Golay sequences, each having a length of 26 symbols. For example, the following may be an example of a Golay sequence of length 26:

Golay 26: [+1 +1 +1 +1 −1 +1 +1 −1 −1 +1 −1 +1 −1 +1 −1 −1 +1 −1 +1 +1 +1 −1 −1 +1 +1 +1]; or Golay 26: [+1 +1 +1 +1 −1 +1 +1 −1 −1 +1 −1 +1 +1 +1 +1 −1 +1 −1 −1 −1 +1 +1 −1 −1 −1]

A receiver may use the L-CEF, CEF-GF, and L-CEF collectively to determine a channel estimation for the frequency ranges associated with the first and second channels and the GF channel. Or, in other words, since the EDMG data payload is transmitted via a bonded channel having a frequency range that overlaps with or has the substantially the same frequency range as the combined frequency ranges of the first channel, GF channel, and second channel, a receiver may use the L-CEF, CEF-GF, and L-CEF collectively to determine a channel estimation for decoding the data in the EDMG data payload.

In order for a receiver to accurately determine channel estimation for the frequency ranges associated with the first channel, GF channel, and second channel, it is desirable that there be minimal overlap in frequency between the first channel and the GF channel, and the second channel and the GF channel. To effectuate such minimal overlap, shaping filters for the first channel L-CEF, CEF-GF, and second channel L-CEF may be implemented with sharp rejection skirts to allow the receiver to estimate correctly the channel for the first channel, GF channel, and second channel. As an example, and exemplified in more detail further herein with respect to FIGS. 15D-15E, the shaping filters are configured such that overlap between the frequency ranges of both L-CEF and CEF-GF, respectively, may occur at substantially 7 dB or more below the passband of the frequency ranges. The passband of the shaping filters should be as flat as possible given design constraints (e.g., ripple <1 dB). As an example, one or more of the shaping filter may be implemented as a Kaiser window based filter with over 200 taps in order to achieve the desired out-of-band rejection and passband flatness. The filter output may be implemented with precomputed signal to avoid hardware impact.

Figure 15A:
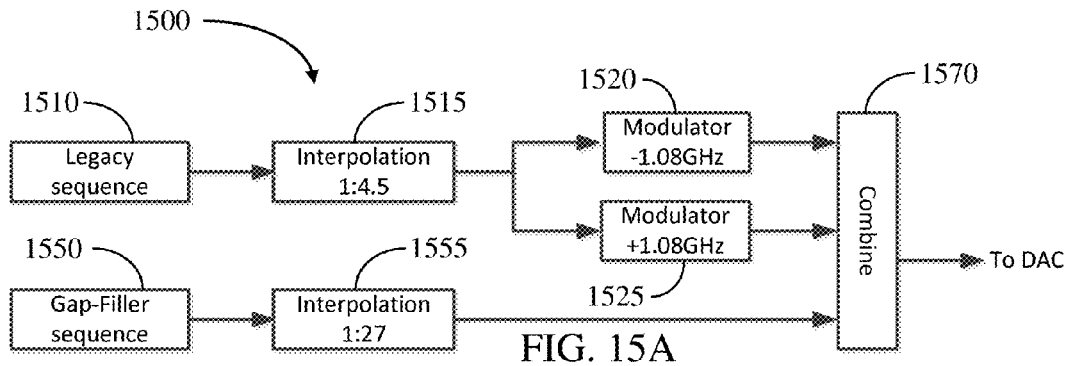
FIGS. 15A-15C illustrate a block diagram of exemplary apparatuses for transmission of various exemplary frames with channel estimation signals in accordance with certain aspects of the present disclosure.
Figure 15B:
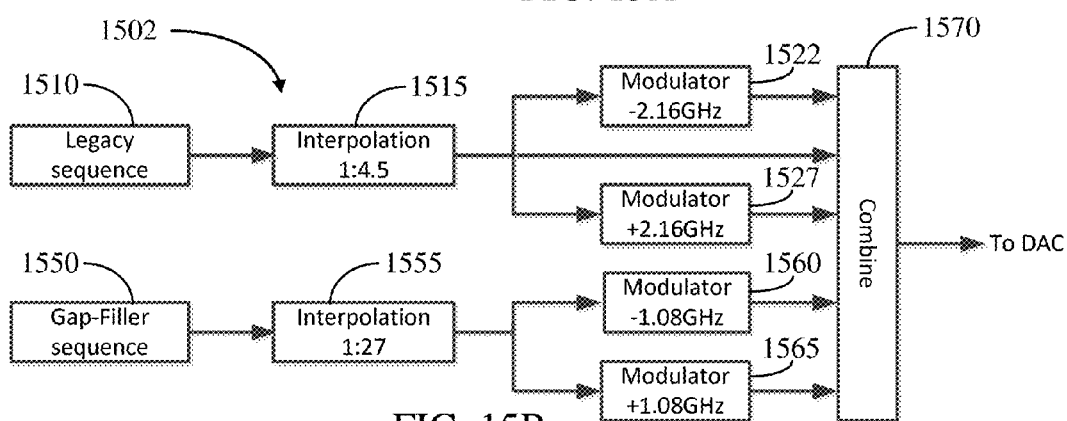
Figure 15C:
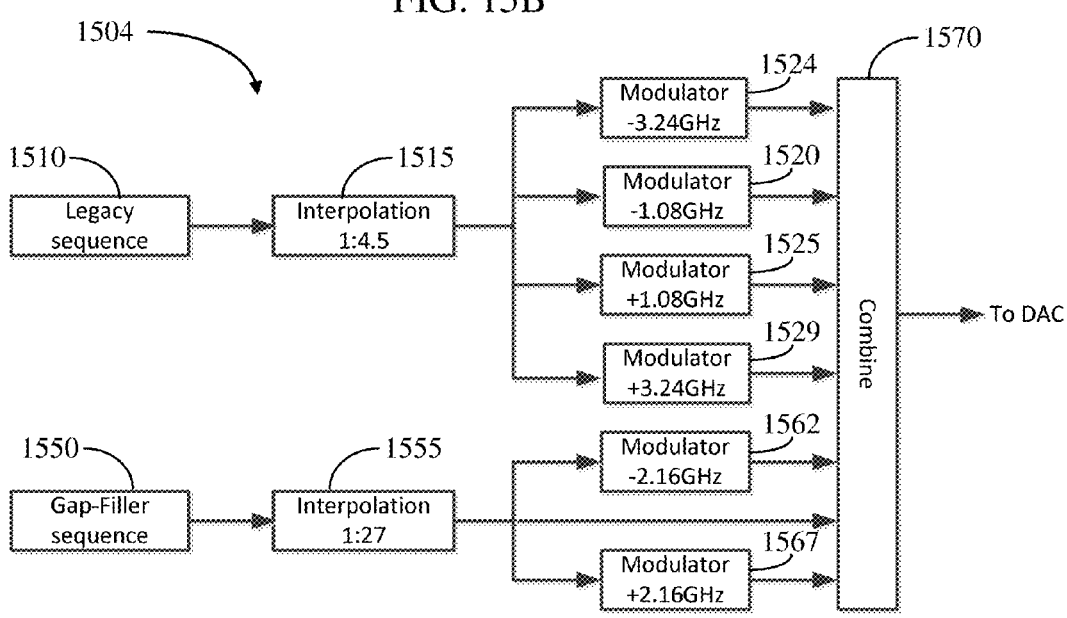

The shaping filters may be implemented in interpolation devices, as further discussed herein with reference to FIGS. 15A-15C. In order to avoid highly complex filters for non-simple ratios, the interpolation devices may use integer or integer multiple of 0.5 for up-sampling an input CEF-GF (e.g., Golay) sequence. The up-sampling is performed in order to achieve a bandwidth for each CEF-GF (e.g., Golay) sequence of substantially 400 MHz so that the sequence signal fills up the GF channel between the first and second channels, and a delay spread for cross-correlation of substantially 72.72 nanoseconds (ns). As such, each CEF-GF will have substantially the same delay spread (e.g., substantially 72.72 ns) as the L-CEF. However, in each of the frames described herein, the CEF-GF interval includes a plurality of CEF-GF sequences repeated a defined number of times (e.g., eight (8)) to reduce error in the channel estimation.

As an example, the interpolation device may perform up-sampling with ratios between 12-18 for a frame having two (2) bonded channels to achieve the 400 MHz bandwidth and 72.72 ns delay spread for input Golay sequences based on lengths 32, 26 and 20, as previously discussed. As another example, the interpolation device may perform up-sampling with ratios between 17-32 for a frame having three (3) bonded channels to achieve the 400 MHz bandwidth and 72.72 ns delay spread for input Golay sequences based on lengths 32, 26 and 20, as previously discussed. As a further example, the interpolation device may perform up-sampling with ratios between 23-40 for a frame having four (4) bonded channels to achieve the 400 MHz bandwidth and 72.72 ns delay spread for input Golay sequences based on lengths 32, 26 and 20, as previously discussed.

The remainder of the frame 420 includes the L-Headers transmitted via the first and second channels following the L-CEF sequences of the first and second channels, respectively. The GF channel may also include a Header-GF transmitted via the GF channel following the CEF-GF. The Header-GF may be optionally transmitted in order to provide additional information beyond the information provided in the L-Header. The L-Headers for the first and second channels, and the Header-GF have substantially the same lengths and are transmitted in a substantially time aligned manner (e.g., the transmission of the beginning and ending of the headers occur at substantially the same time).

Additionally, the frame 420 includes the EDMG Header and optional attached data transmitted via the first and second channels following the corresponding L-Headers. The EDMG Headers for the first and second channels have the substantially same lengths and are transmitted in a substantially time aligned manner (e.g., the transmission of the beginning and ending of the EDMG Headers occur at substantially the same time).

As illustrated, the frame 420 includes the EDMG data payload transmitted via a bonded channel following the EDMG Headers of the first and second channels. Frame 420 is an example of a channel bonding of two as the frequency band of the bonded channel overlaps with the frequency bands of the first and second channels of the frame 420. Or, alternatively, the lower and upper ends of the frequency band of the bonded channel substantially align in frequency with the lower end of the frequency band of the first channel and the upper end of the frequency band of the second channel, respectively. Since the frequency band of the bonded channel also encompasses the frequency band of the GF channel, the L-CEF of the first and second channels and the CEF-GF of the GF channel are collected by a receiver to determine or generate a channel estimation for the frequency range of the bonded channel to facilitate the receiver decoding the EDMG data payload transmitted via the bonded channel.

As previously discussed, the transmission of the L-Header and EDMG Header are transmitted using MCS specified in the legacy 802.11ad protocol. The data in the separate new protocol (802.11ay) payload is transmitted using one of the MCS specified in the new protocol 802.11ay. Since the new protocol includes additional MCS beyond those specified in the legacy 802.11ad, the EDMG data payload may be transmitted using an MCS different than the MCS used to transmit the L-Header and EDMG Header. However, it shall be understood that the MCS used for transmitting the EMDG data payload may be the same as the MCS used for transmitting the L-Header and EDMG Header, as the 802.11ay may include the same MCS specified in the legacy 802.11ad.

Frame 440 is an example of an OFDM frame with a channel bonding of three. Frame 440 is similar to the OFDM frame 420 with a channel bonding of two, but includes an additional third channel and an additional second GF channel situated in frequency between the second and third channels. The EDMG data payload is transmitted by way of a bonded channel having a frequency band that overlaps with the frequency bands of the first channel, first GF channel, second channel, second GF channel, and third channel. Or, alternatively, the lower and upper ends of the frequency band of the bonded channel substantially align in frequency with the lower end of the frequency band of the first channel and the upper end of the frequency band of the third channel, respectively. A receiver may collect the L-CEF of the first, second, and third channels, and the CEF-GF of the first and second GF channels to determine or generate a channel estimation for the frequency range of the bonded channel to facilitate the decoding of the EDMG data payload transmitted via the bonded channel.

Frame 460 is an example of an OFDM frame with a channel bonding of four. Frame 460 is similar to OFDM frame 440 with a channel bonding of three, but includes an additional fourth channel and an additional third GF channel situated in frequency between the third and fourth channels. The EDMG data payload is transmitted by way of a bonded channel having a frequency band that overlaps with the frequency bands of the first channel, first GF channel, second channel, second GF channel, third channel, third GF channel, and fourth channel. Or, alternatively, the lower and upper ends of the frequency band of the bonded channel substantially align in frequency with the lower end of the frequency band of the first channel and the upper end of the frequency band of the fourth channel, respectively. Similarly, a receiver may collect the L-CEF of the first, second, third, and fourth channels, and the CEF-GF of the first, second, and third GF channels to determine or generate a channel estimation for the frequency range of the bonded channel to facilitate the decoding of the data payload transmitted via the bonded channel.

The EDMG Header for the OFDM frames 400, 420, 440, and 460 is format-wise essentially the same as the EDMG Header 350 previously discussed, except that the Power difference field bits are indicated as reserved bits. This is because OFDM frames may be transmitted with a substantially uniform average power throughout the duration of the frame.

Although frames 420, 440, and 460 are examples of frames with channel bonding of two, three, and four, respectively, it shall be understood that a frame may be configured in a similar manner to provide more an OFDM frame with channel bonding of more than four.

Frame Format for OFDM with L-Header and CEF-GF Transmitted at the Same Time

Figure 5A:
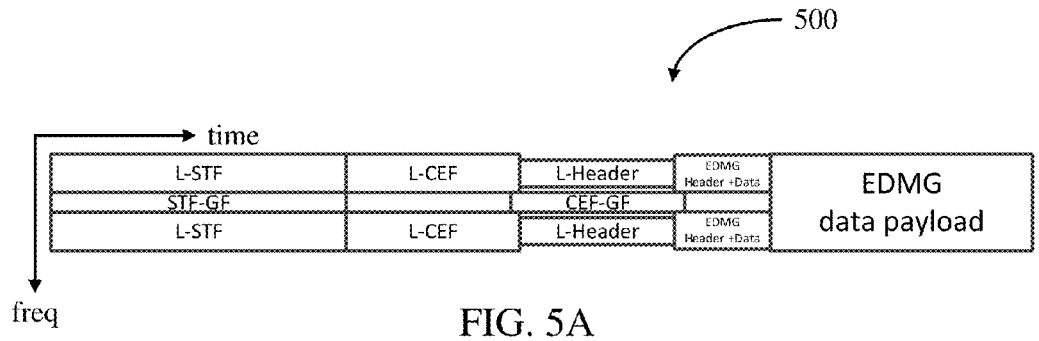
FIGS. 5A-5C illustrate another set of exemplary frames for transmission of data via an orthogonal frequency division multiplexing (OFDM) transmission in accordance with certain aspects of the present disclosure.
Figure 5B:
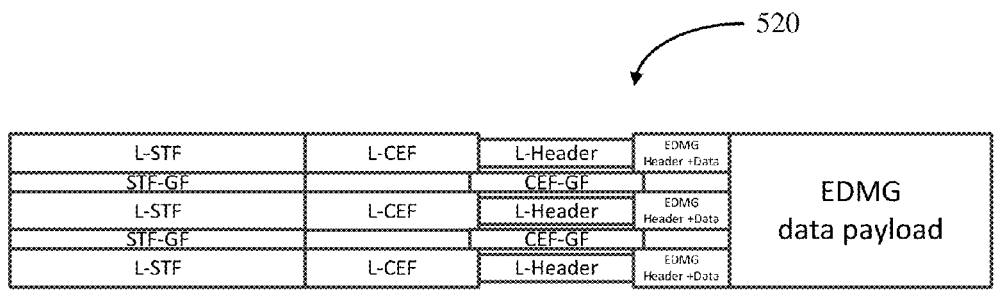
Figure 5C:
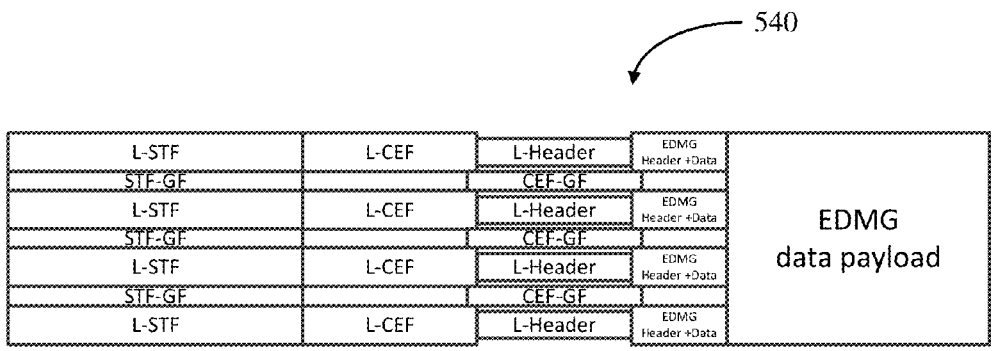

FIGS. 5A-5C illustrate exemplary frames 500, 520, and 540 for transmission of data payload via two, three, and four bonded channels by way of an OFDM transmission in accordance with another aspect of the disclosure. In summary, the CEF-GF of one or more gap filling (GF) channels are transmitted at the same as the L-Headers of two or more channels in each of the frames 500, 520, and 540.

Considering the OFDM frame 500 with a channel bonding of two, the frame includes a first (lower frequency) channel for transmission of an L-STF, L-CEF, L-Header, and EDMG Header with optional attached data. The frame 500 further comprises a second (upper frequency) channel for transmission of another L-STF, L-CEF, L-Header, and EDMG Header with optional attached data. The L-STF, L-CEF, L-Header, and EDMG Header of the first and second channels have substantially the same transmission lengths and are transmitted in a substantially time aligned manner. The first channel is associated with a first frequency band and the second channel is associated with a second frequency band different or spaced apart from the first frequency band. The first and second frequency bands each have a bandwidth of substantially 1.76 GHz.

The frame 500 further comprises a gap filling (GF) channel including a frequency band situated between the respective frequency bands of the first and second channels. The bandwidth of the GF channel may be 440 MHz, wherein 20 MHz of a lower end of the GF channel may overlap (during some portion of the frame) with 20 of the upper end of the first channel, and 20 MHz of the upper end of the GF channel may overlap (during some portion of the frame) with 20 MHz of a lower end of the second channel. The frame 500 includes, for transmission via the GF channel, an STF-GF having substantially the same transmission length or duration as the L-STF of the first and second channels, and configured for transmission in a substantially time aligned manner as the L-STF of the first and second channels. A receiver may receive the L-STF of the first and second channels and the STF-GF of the GF channel to perform AGC (power) adjustment and/or other purposes for receiving the rest of the frame.

The frame 500 further comprises a CEF-GF for transmission via the GF channel. The CEF-GF may be based on a Golay sequence. For example, the CEF-GF may be based on Golay sequences, each having a length of 32 symbols as specified in 802.11ad, Table 21-18, previously discussed with reference to frames 420, 440, and 460. The frame 500 is configured such that a portion of the CEF-GF is transmitted at the same time as a portion of the L-Headers of the first and second channels. More specifically, or alternatively, since the CEF-GF has a length of substantially 0.73 μs, and the L-Headers each have a length of substantially 0.58 μs, the frame 500 may be configured such that the transmission of the CEF-GF begins slightly before the transmission of the L-Headers begins, and ends after the transmission of the L-Headers has ended.

To ease the filter requirement for the CEF-GF transmission, the L-Header transmissions may be narrowed in the frequency domain by passing the signal via a narrowing filter (or any similar method) in order to set small frequency gaps between the L-Headers and the CEF-GF, respectively. Exemplary frequency spectrum of the L-Header and CEF-GF transmissions are discussed further herein with reference to FIGS. 15F-15G.

The frame 500 further comprises an EDMG data payload for transmission via a bonded channel. The transmission of the EDMG data payload follows the transmission of the EDMG Headers of the first and second channels. The bonded channel has a frequency band that overlaps with the frequency bands of the first and second channels, and the GF channel. More specifically, or alternatively, a lower end of the frequency band of the bonded channel substantially coincides in frequency with a lower end of the frequency band of the first channel, and an upper end of the frequency band of the bonded channel substantially coincides in frequency with an upper end of the frequency band of the second channel.

Since the frequency band of the bonded channel overlaps or substantially coincides with the combined frequency ranges of the first channel, GF channel, and second channel, a receiver may collect the L-CEF of the first and second channel, and the CEF-GF of the GF channel to determine or generate a channel estimation for the frequency band of the bonded channel Because the L-CEF of the first and second channels are transmitted earlier than the CEF-GF, the receiver may need to buffer information associated with the L-CEF in the process of receiving the CEF-GF. The receiver uses the generated channel estimation associated with the bonded channel in order to decode the EDMG data payload transmitted via the bonded channel.

Frame 520 is an example of an OFDM frame with a channel bonding of three. Frame 520 is similar to that of OFDM frame 500 with a channel bonding of two, but includes an additional third channel and an additional second GF channel situated in frequency between the second and third channels. The EDMG data payload is transmitted by way of a bonded channel having a frequency band that overlaps with the frequency bands of the first channel, first GF channel, second channel, second GF channel, and third channel. Or, alternatively, the lower and upper ends of the frequency band of the bonded channel substantially align in frequency with the lower end of the frequency band of the first channel and the upper end of the frequency band of the third channel, respectively. A receiver may collect the L-CEF of the first, second, and third channels, and the CEF-GF of the first and second GF channels to determine or generate a channel estimation for the frequency band of the bonded channel to facilitate the decoding of the EDMG data payload transmitted via the bonded channel.

Frame 540 is an example of an OFDM frame with a channel bonding of four. Frame 540 is similar to that of OFDM frame 520 with a channel bonding of three, but includes an additional fourth channel and an additional third GF channel situated in frequency between the third and fourth channels. The EDMG data payload is transmitted by way of a bonded channel having a frequency band that overlaps with the frequency bands of the first channel, first GF channel, second channel, second GF channel, third channel, third GF channel, and fourth channel. Or, alternatively, the lower and upper ends of the frequency band of the bonded channel substantially align in frequency with the lower end of the frequency band of the first channel and the upper end of the frequency band of the fourth channel, respectively. Similarly, a receiver may collect the L-CEF of the first, second, third, and fourth channels, and the CEF-GF of the first, second, and third GF channels to determine or generate a channel estimation for the frequency band of the bonded channel to facilitate the decoding of the data payload transmitted via the bonded channel.

Figure 6A:
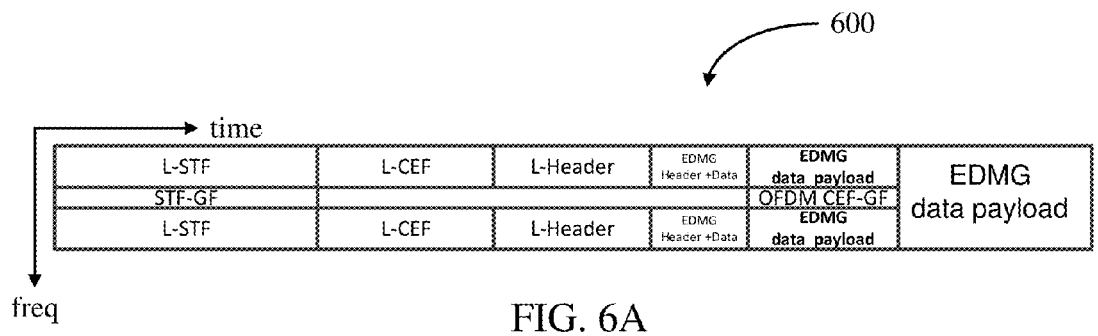
FIGS. 6A-6C illustrate yet another set of exemplary frames for transmission of data via an orthogonal frequency division multiplexing (OFDM) transmission in accordance with certain aspects of the present disclosure.
Figure 6B:
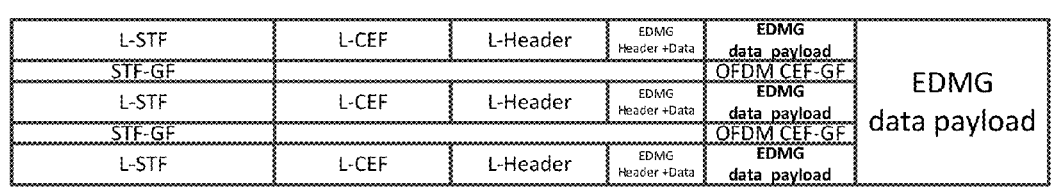
Figure 6C:
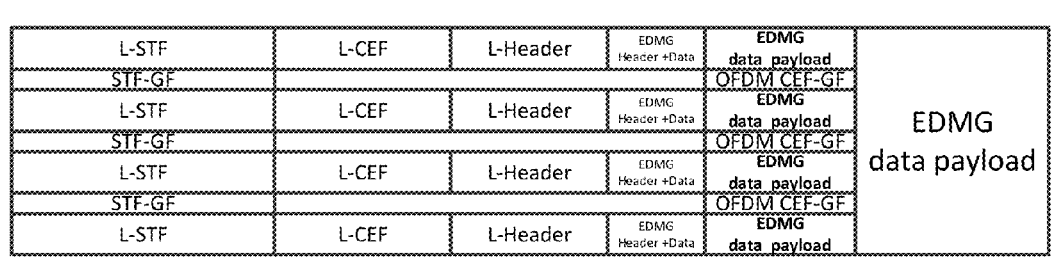

Frame Format for OFDM with CEF-GF Transmitted Simultaneous with Portions of the Data Payload FIGS. 6A-6C illustrate exemplary frames 600, 620, and 640 for transmission of data payload via two, three, and four bonded channels by way of an OFDM transmission in accordance with another aspect of the disclosure. In summary, the CEF-GF of one or more gap filling (GF) channels are transmitted at the same time as portions of the EDMG data payload in each of the frames 600, 620, and 640.

Considering the OFDM frame 600 with a channel bonding of two, the frame includes a first (lower frequency) channel for transmission of an L-STF, L-CEF, L-Header, EDMG Header with optional attached data, and a portion (e.g., two OFDM symbols) of the EDMG data payload. The frame 600 further comprises a second channel (upper frequency) for transmission of another L-STF, L-CEF, L-Header, EDMG Header with optional attached data, and another portion (e.g., two OFDM symbols) of the EDMG data payload. The L-STF, L-CEF, L-Header, EDMG Header, and EDMG data payload portions of the first and second channels have substantially the same transmission lengths and are transmitted in a substantially time aligned manner. The first channel is associated with a first frequency band and the second channel is associated with a second frequency band different or spaced apart from the first frequency band. The first and second frequency bands each have a bandwidth of substantially 1.76 GHz.

The frame 600 further comprises a gap filling (GF) channel including a frequency band situated between the respective frequency bands of the first and second channels. The bandwidth of the GF channel is 440 MHz, wherein 20 MHz of a lower end of the GF channel may overlap with 20 MHz of the upper end of the first channel, and 20 MHz of the upper end of the GF channel may overlap with 20 MHz of a lower end of the second channel. The frame 600 includes, for transmission via the GF channel, an STF-GF having substantially the same transmission length or duration as the L-STF of the first and second channels, and configured for transmission in a substantially time aligned manner as the L-STF of the first and second channels. A receiver may receive the L-STF of the first and second channels and the STF-GF of the GF channel to perform AGC (power) adjustment for receiving the rest of the frame.

The frame 600 further comprises an OFDM CEF-GF for transmission via the GF channel. The OFDM CEF-GF may comprise a pilot (information known to a receiver) transmitted during the portions of the EDMG data payloads transmitted via the first and second channels. For instance, the OFDM CEF-GF may be transmitted simultaneously or in a time aligned manner with two OFDM data symbols of the EDMG data payload portions transmitted via the first and second channels. The pilot information may be randomized by a given pseudorandom number generator (PRNG) to avoid spectral/time patterns. The frequency width of the GF channel during the transmission of the CEF-GF should be 400 MHz or slightly higher to compensate also for the L-CEF edges so that a more accurate channel estimation may be achieved of the frequency band of the bonded channel During the transmission of the portions (e.g., first two OFDM symbols) of the EDMG data payload via the first and second channels, data is placed in subcarriers avoiding pilot carriers, and pilots are placed in the designated pilot subcarriers.

The frame 600 further comprises an EDMG data payload for transmission via a bonded channel. The transmission of the EDMG data payload via the bonded channel follows the transmission of the portions of the EDMG data payload transmitted via the first and second channels, and the OFDM CEF-GF transmitted via the GF channel. The bonded channel has a frequency band that overlaps with the frequency bands of the first and second channels, and the GF channel. More specifically, or alternatively, a lower end of the frequency band of the bonded channel substantially coincides in frequency with a lower end of the first channel, and an upper end of the frequency band of the bonded channel substantially coincides in frequency with an upper end of the second channel.

Since the frequency band of the bonded channel overlaps or substantially coincides with the combined frequency bands of the first channel, GF channel, and second channel, a receiver may collect the L-CEF of the first and second channel, and the OFDM CEF-GF of the GF channel to determine or generate a channel estimation for the frequency band of the bonded channel. Because the L-CEF of the first and second channels are transmitted earlier than the OFDM CEF-GF, the receiver may need to buffer information associated with the L-CEF while in process of receiving the OFDM CEF-GF. The receiver uses the generated channel estimation associated with the bonded channel in order to decode the EDMG data payload transmitted via the bonded channel.

Frame 620 is an example of an OFDM frame with a channel bonding of three. Frame 620 is similar to that of OFDM frame 600 with a channel bonding of two, but includes an additional third channel and an additional second GF channel situated in frequency between the second and third channels. The EDMG data payload is transmitted by way of a bonded channel having a frequency band that overlaps with the frequency bands of the first channel, first GF channel, second channel, second GF channel, and third channel. Or, alternatively, the lower and upper ends of the frequency band of the bonded channel substantially aligns in frequency with the lower end of the frequency band of the first channel and the upper end of the frequency band of the third channel, respectively. A receiver may collect the L-CEF of the first, second, and third channels, and the OFDM CEF-GF of the first and second GF channels to determine or generate a channel estimation associated with the bonded channel to facilitate the decoding of the EDMG data payload transmitted via the bonded channel.

Frame 640 is an example of an OFDM frame with a channel bonding of four. Frame 640 is similar to that of OFDM frame 620 with a channel bonding of three, but includes an additional fourth channel and an additional third GF channel situated in frequency between the third and fourth channels. The EDMG data payload is transmitted by way of a bonded channel having a frequency band that overlaps with the frequency bands of the first channel, first GF channel, second channel, second GF channel, third channel, third GF channel, and fourth channel. Or, alternatively, the lower and upper ends of the frequency band of the bonded channel substantially align in frequency with the lower end of the frequency band of the first channel and the upper end of the frequency band of the fourth channel, respectively. Similarly, a receiver may collect the L-CEF of the first, second, third, and fourth channels, and the OFDM CEF-GF of the first, second, and third GF channels to determine or generate a channel estimation associated with the bonded channel to facilitate the decoding of the EDMG data payload transmitted via the bonded channel.

Frame Format for SC WB with L-CEF AND CEF-GF Transmitted Simultaneously

Figure 7A:
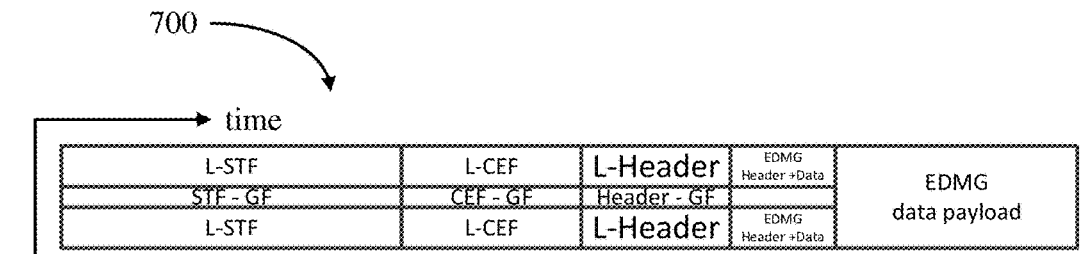
FIGS. 7A-7C illustrate a set of exemplary frames for transmission of data via a single carrier wideband (SC WB) transmission in accordance with certain aspects of the present disclosure.
Figure 7B:
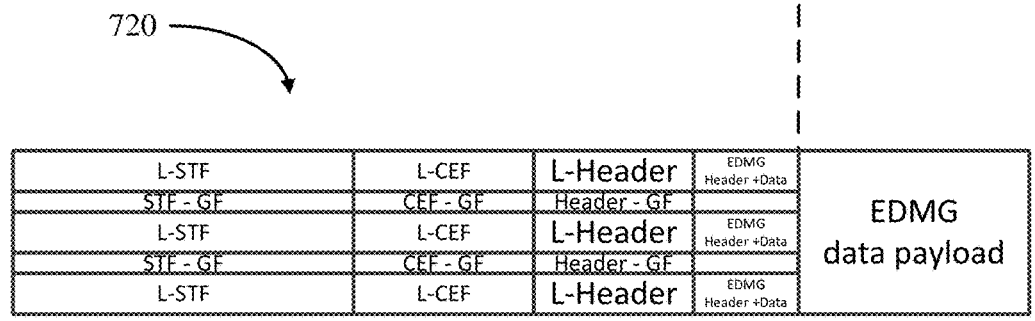
Figure 7C:
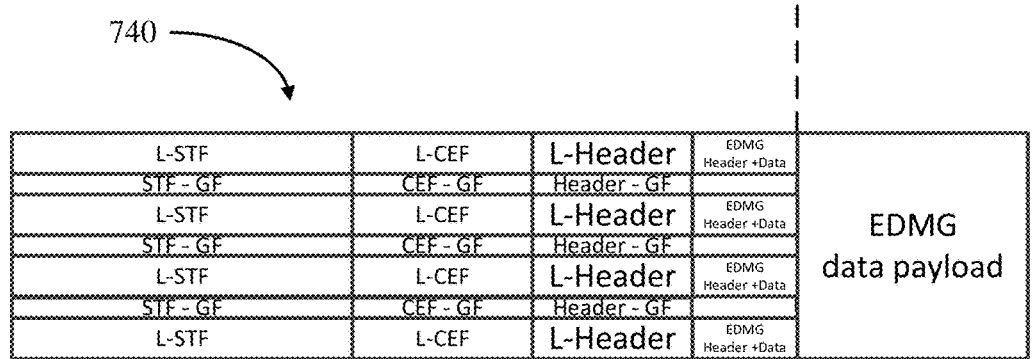

FIGS. 7A-7C illustrate exemplary frames 700, 720, and 740 for transmission of data via single carrier wideband (SC WB) transmission in accordance with an aspect of the disclosure. The frames 700, 720, and 740 may be example frames for transmitting the data payload via channel bonding of two, channel bonding of three, and channel bonding of four, respectively. The structures of the SC WB frames 700, 720, and 740 are substantially the same as the structures of the OFDM frames 420, 440, and 460, respectively. This has the advantage of simplifying the processing of both the SC WB and OFDM frames.

Figure 7D:
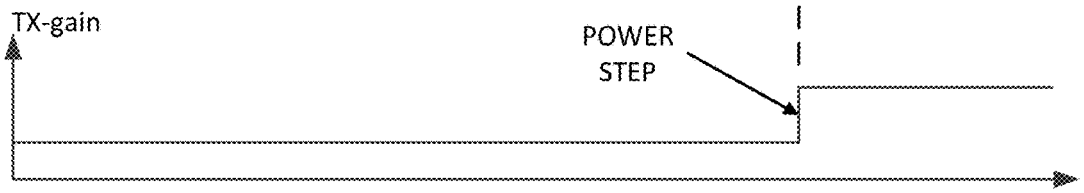
FIG. 7D illustrates an exemplary transmission power profile associated with the set of exemplary frames of FIGS. 7A-7C in accordance with certain aspects of the present disclosure.
Figure 8A:
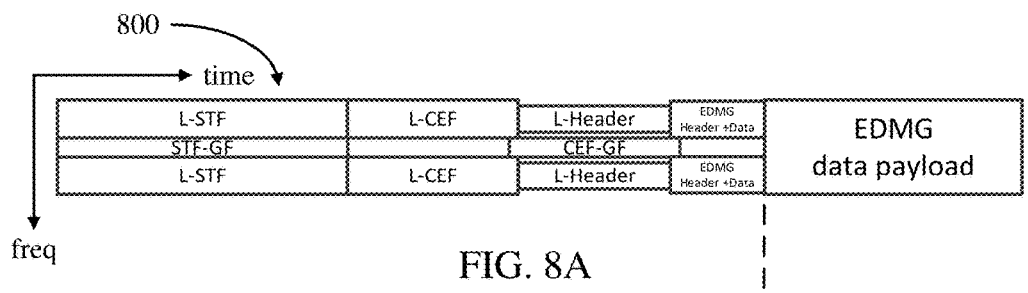
FIGS. 8A-8C illustrate another set of exemplary frames for transmission of data via a single carrier wideband (SC WB) transmission in accordance with certain aspects of the present disclosure.
Figure 8B:
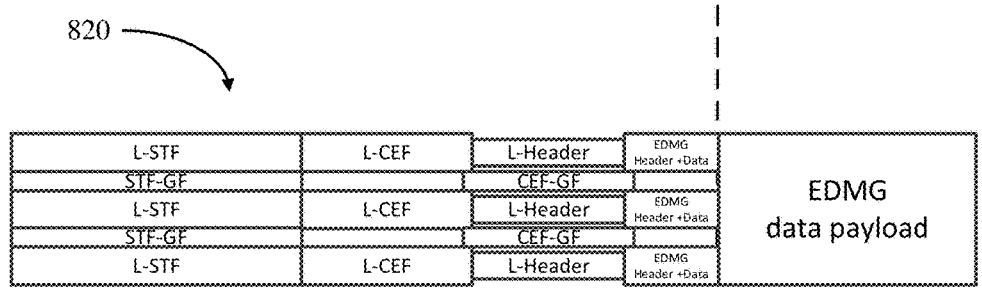
Figure 8C:
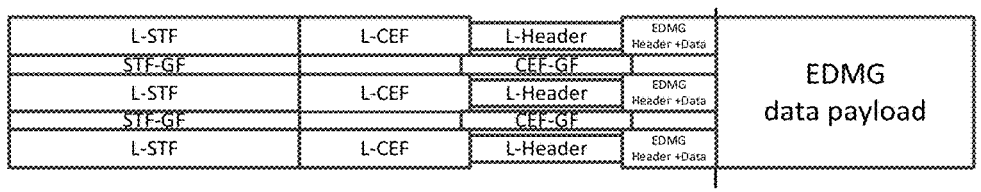
Figure 8D:
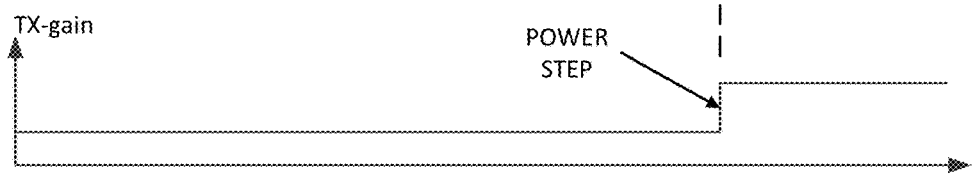
FIG. 8D illustrates an exemplary transmission power profile associated with the set of exemplary frames of FIGS. 8A-8C in accordance with certain aspects of the present disclosure.

The main difference between the SC WB frames 700, 720, and 740 and the OFDM frames 420, 440, and 460 is that the data payload is transmitted via a SC WB transmission in frames 700, 720, and 740, and the data payload is transmitted via an OFDM transmission in frames 420, 440, and 460. Other differences entail the L-STF, L-CEF, L-Header, and EDMG Header/data of the two or more channels, and the one or more GF channels being transmitted at a lower power than the EDMG data payload as indicated in the transmission power profile diagram of FIG. 7D. As previously discussed, the EDMG Header and the L-Header may include bits to signify the transmission power difference between the legacy portion and the EDMG portion of the frames. Also, the L-CEF of the SC WB frames 700, 720, and 740 may be based on a different Golay sequence than that of the L-CEF of the OFDM frames 420, 440, and 460, as indicated by the 802.11ad protocol.

Frame Format for SC WB with L-Header and CEF-GF Transmitted at the Same Time

FIGS. 8A-8D illustrates exemplary frames 800, 820, and 840 for transmission of data via single carrier wideband (SC WB) transmission in accordance with an aspect of the disclosure. The frames 800, 820, and 840 may be example frames for transmitting the data payload via a channel bonding of two, channel bonding of three, and channel bonding of four, respectively. The structures of the SC WB frames 800, 820, and 840 are substantially the same as the structures of the OFDM frames 500, 520, and 540, respectively. Again, this is done to simplify the processing of both the SC WB and OFDM frames.

Similarly, the main difference between the SC WB frames 800, 820, and 840 and the OFDM frames 500, 520, and 540 is that the data payload is transmitted via a SC WB transmission in frames 800, 820, and 840, and the data payload is transmitted via an OFDM transmission in frames 500, 520, and 4540. Other differences entail the L-STF, L-CEF, L-Header, and EDMG Header/data of the two or more channels, and the one or more GF channels being transmitted at a lower power than the EDMG data payload as indicated in the transmission power profile diagram of FIG. 8D. As previously discussed, the EDMG Header and the L-Header may include bits to signify the transmission power difference between the legacy portion and the EDMG portion of the frames. Also, the L-CEF of the SC WB frames 800, 820, and 840 may be based on a different Golay sequence than that of the L-CEF of the OFDM frames 520, 540, and 560, as indicated by the 802.11ad protocol.

Frame Format for SC WB with EDMG CEF

FIGS. 9A-9D illustrate exemplary frames 900, 920, and 940 for transmission of data via single carrier wideband (SC WB) transmission in accordance with an aspect of the disclosure. The frames 900, 920, and 940 may be example frames for transmitting the data payload via a channel bonding of two, channel bonding of three, and channel bonding of four, respectively. Unlike the frames 700, 720, and 740, and frames 800, 820, and 840, frames 900, 920, and 940 do not include a gap filling (GF) channel with a CEF-GF. Instead, frames 900, 920, and 940 include an EDMG STF and EDMG CEF for transmission via the corresponding bonded channel.

Figure 9A:
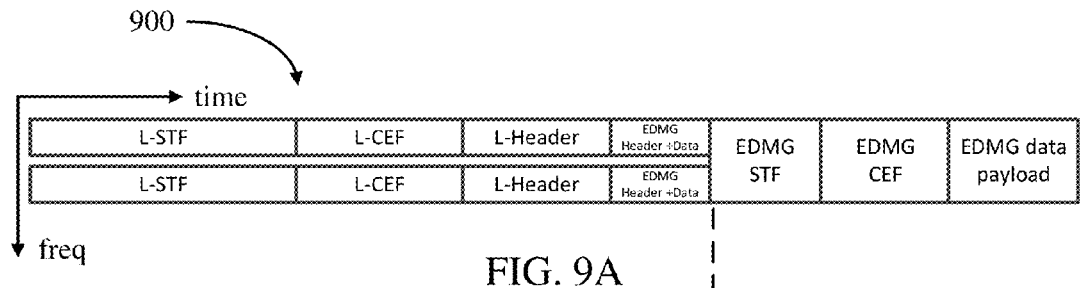
FIGS. 9A-9C illustrate yet another set of exemplary frames for transmission of data via a single carrier wideband (SC WB) transmission in accordance with certain aspects of the present disclosure.
Figure 9B:
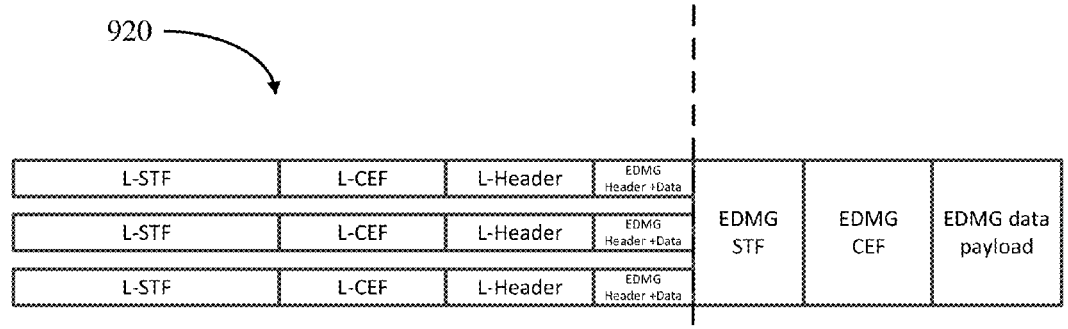
Figure 9C:
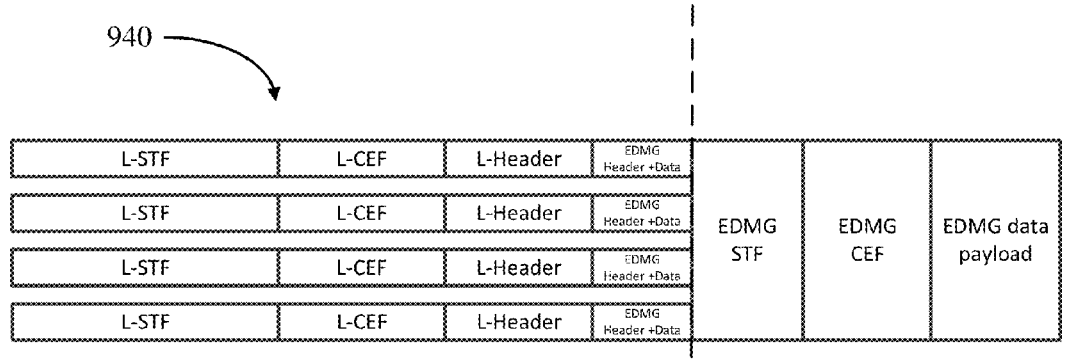
Figure 9D:
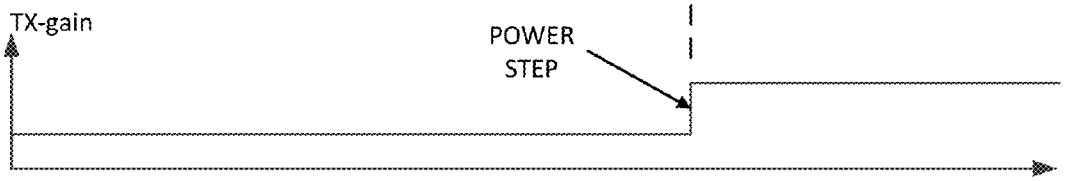
FIG. 9D illustrates an exemplary transmission power profile associated with the set of exemplary frames of FIGS. 9A-9C in accordance with certain aspects of the present disclosure.
Figure 10A:
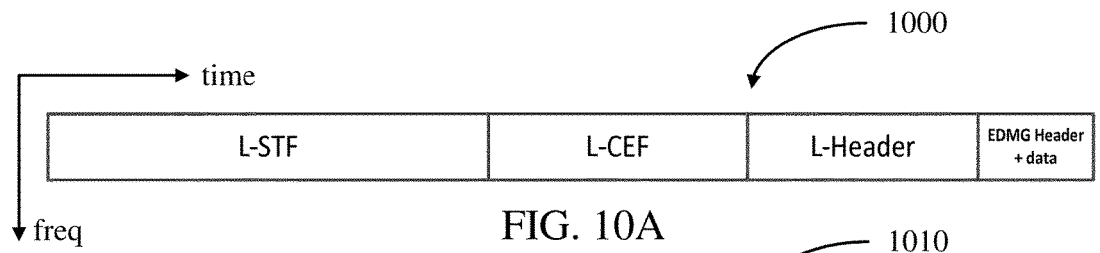
FIGS. 10A-10D illustrate exemplary frames for transmission of short messages in accordance with another aspect of the disclosure.
Figure 10B:
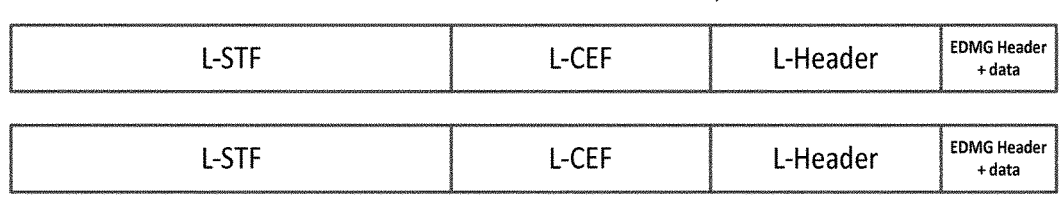
Figure 10C:
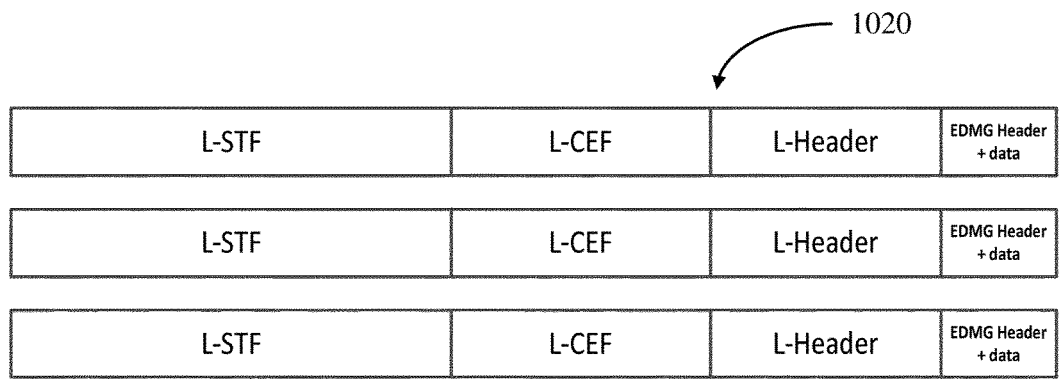
Figure 10D:
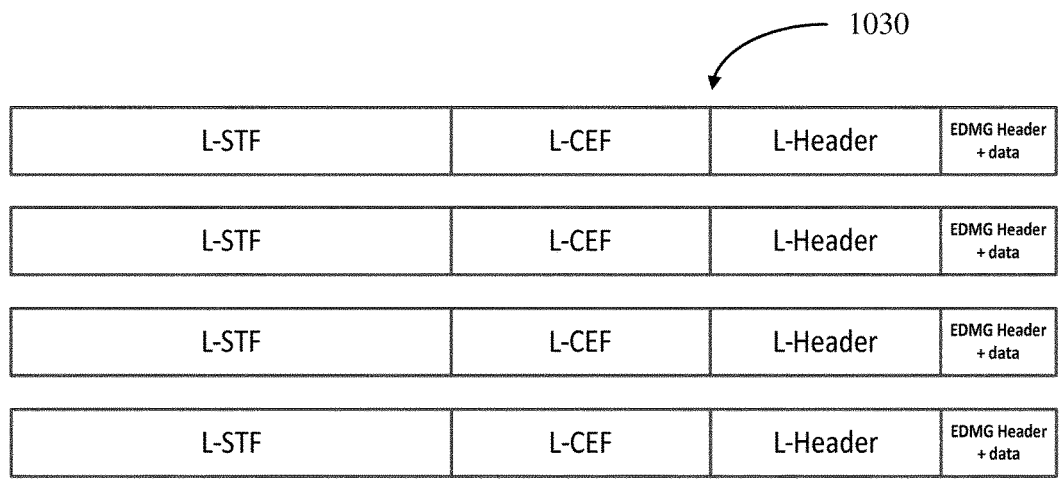
Figure 11A:
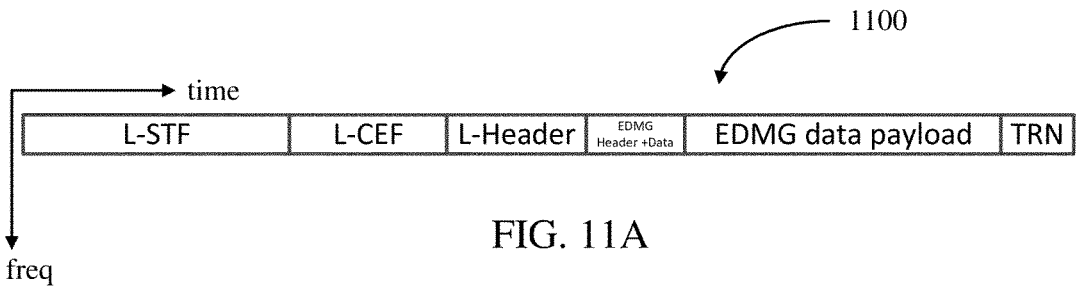
FIGS. 11A-11D illustrate exemplary frames for transmission of data via an aggregated single carrier (SC) transmission in accordance with certain aspects of the present disclosure.
Figure 11B:
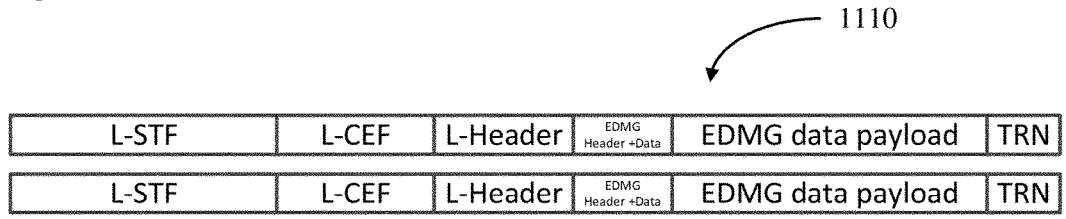
Figure 11C:
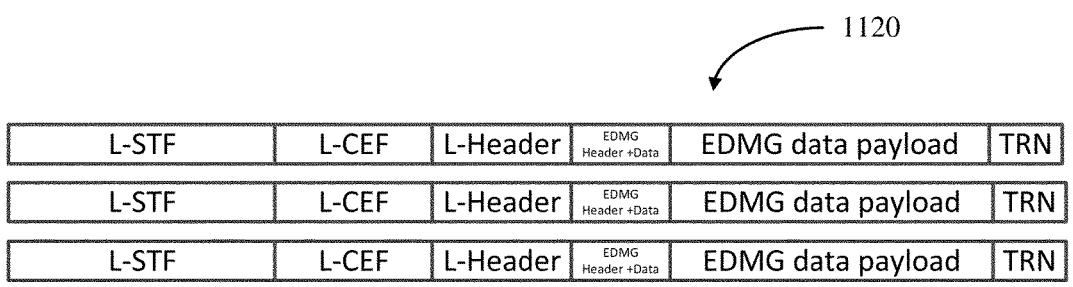
Figure 11D:
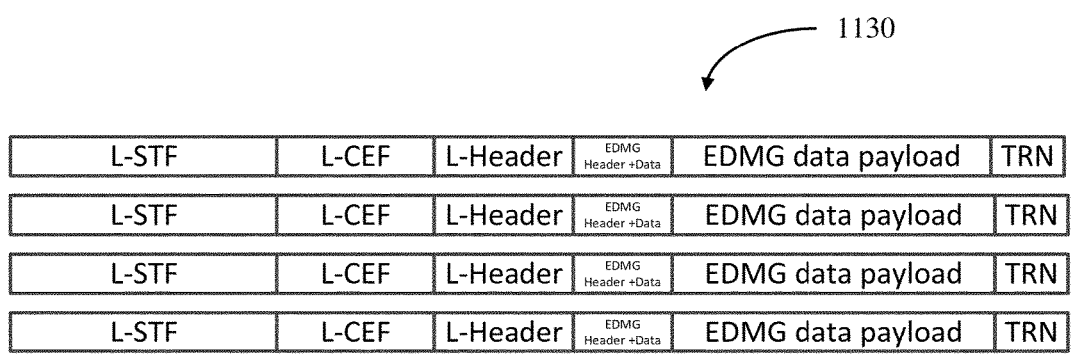

A receiver uses the L-STF legacy portion of the frames for AGC (power) and timing adjustments based on the backed-off or lower transmit power as indicated in FIG. 9D for receiving the legacy portion of the frames. The receiver also uses the L-CEF for determining or generating channel estimations for receiving the legacy portion of the frames. The receiver uses the EDMG STF of the bonded channel for AGC (power) and timing adjustment based on the increased transmission power level of the 802.11ay portion of the frames as indicated in FIG. 9D. The receiver uses the EDMG CEF transmitted via the bonded channel for determining and generating a channel estimation associated with the bonded channel.

As illustrated, the EDMG transmission includes three (3) sections that are present (EDMG STF, EDMG CEF, and EDMG data payload) and an optional beam training sequence (TRN) (not shown). The EDMG STF is built on Golay codes (as in the legacy STF). During this period, a receiver is expected to complete: AGC, timing and frequency acquisition. The EDMG STF uses Ga and Gb in the same order as the 802.11ad. Optionally, the Golay codes can be 128 (as in 802.11ad) or 256 or 512.

The EDMG CEF sequence may also be based on a Golay construction of the CEF sequence of 802.11ad, only replacing the 128 sequences to 256 sequences for two bonded channels, to 512 sequences for three or four bonded channels, and to 1024 for 5-8 bonded channels. The formats of the Golay sequences of length 256, 512 and 1024 are as follows, using the $Ga_{128}$ and $Gb_{128}$ from the 802.11ad standard:

$Ga_{256}=[Ga_{128}\ Gb_{128}]$ and $Gb_{256}=[Ga_{128}\ -Gb_{128}]$
$Ga_{512}=[Ga_{256}\ Gb_{256}]$ and $Gb_{512}=[Ga_{256}\ -Gb_{256}]$
$Ga_{1024}=[Ga_{512}\ Gb_{512}]$ and $Gb_{1024}=[Ga_{512}\ -Gb_{512}]$ The EDMG data payload is modulated using MCS similar to the 802.11ad with the following changes: (1) In addition to BPSK, QPSK and 16QAM, higher modulations are defined (and can be used): 64QAM, 64APSK, 128APSK, 256QAM, 256APSK; (2) FFT block can be 512 (as in 802.11ad) or 768, 1024, 1536 or 2048; and (3) GI is also Golay code as in 802.11ad, with more length options supported: 32, 64 (as in 802.11ad), 128 or 256.

As previously discussed, the beam training sequence (TRN) is optional in all cases. Note that if the 802.11ay section is not used, then the TRN is same as in 802.11ad. When 802.11ay section is used, then it uses the 802.11ay TRN options. 802.11ay TRN field is built in the same way as the 802.11ad, with options to increase the Golay codes by factor of 2 or 4 (e.g. use Golay of 256 or 512, instead of 128).

With regard to exemplary frame 900, this case is the extension of 802.11ay for a two channel bonding case. The frame 900 comprises a first channel (upper channel shown) for transmitting the legacy preamble (L-STF and L-CEF), L-Header, and EDMG Header with optional attached data. The frame 900 further comprises a second channel (lower channel shown) for transmitting the legacy preamble (L-STF and L-CEF), L-Header, and EDMG Header with optional attached data. Note, that the attached data following the EDMG Header of the first channel may be different than the attached data following the EDMG header of the second channel. The information fields of the EDMG Header may be configured as per EDMG Header 350 previously discussed. The 802.11ay section of the frame 900, namely the EDMG STF, EDMG CEF, EDMG data payload, and optional TRN transmitted via a bonded channel has a frequency band that overlaps with the frequency bands of the first and second channels. As previously discussed, the transmission of the L-STF, L-CEF, L-Header, and EDMG Header uses an MCS specified in legacy 802.11ad, and the transmission of the EDMG STF, EDMG CEF, and EDMG data payload uses an MCS specified in 802.11ay, both of which may be different.

With regard to exemplary frame 920, this case is the extension of 802.11ay frame for a three (3) channel bonding case. With regard to exemplary frame 940, this case is the extension of 802.11ay frame for the four (4) channel bonding case. From the above drawings, it is clear that the method is extendable to any number of contiguous channels.

When a station transmits on more than one channel, it may shift the symbol time between channels by any amount of time with the only constrain that the maximum difference between the earliest and latest will not exceed 1 symbol time in 1.76 GHz sampling rate. It means that the maximum difference is limited to 0.568 nsec. The main reason for doing so is to reduce the aggregated PAPR. The time synchronization between the aggregate portion and the 802.11ay portion should be kept relative to the first (lowest-frequency) channel. Note that this skew is only for SC transmissions and not allowed in OFDM modes. Example: in two channels mode the shift can be ½ symbol, in tree channels it can be ⅓ and ⅔ symbols, and in four channels ¼, ½ and ¾ symbols respectively.

FIG. 9D illustrate an exemplary transmission power profile for any of the exemplary frames 900, 920, and 940 in accordance with another aspect of the disclosure. The use of 802.11ay data and Aggregate legacy preambles and Header impose different transmitter back-offs due to PAPR differences and practical PAs. For any modulation scheme, one transmission has less PAPR than if the same modulation is used for two or more aggregated signals in order to keep the error vector magnitude (EVM) and/or transmission mask in compliance. It should be noted that different modulations have different PAPR, thus requiring different back-offs. The backoff value is implementation dependent (mainly on the PA).

In order to keep the 802.11ay transmission as efficient as possible in many cases, the legacy section transmitted in aggregation mode will require a higher backoff. This difference is an issue that may affect the receiver performance. To help receivers mitigate this, it is suggested that two mechanisms one for the legacy receivers and one for the targeted 11ay receiver may be employed. The transmitted power change is at the switch from aggregated period to the 802.11ay period, as shown in FIG. 9D.

The targeted 802.11ay receiver usually adjusts the receive chain at the beginning of the L-STF. If there is a power change between the legacy portion and the 802.11ay portion, the receiver may get into saturation. The receiver can adjust the AGC during the EDMG STF, but this may reduce the time allotted for other activities, such as frequency and time acquisition on the 802.11ay signal. To help the receiver, the Power difference field in the EDMG Header specifies the power step. The receiver may use it to anticipate the required AGC step, thus shortening the AGC processing for the 802.11ay portion.

Legacy receivers (802.11ad) that receive the legacy preamble and L-Header, use these portions to update the NAV as one of the collision avoidance methods. However, these receivers also look at the received power, since in some cases, the received power is low enough to allow reuse of the medium. In this case, the power step can mislead some of the receivers if the power is near the border. The update to the L-Header format, as previously mentioned, describes an option to signal the power step. A legacy receiver that can decode these bits may act upon it to improve its power estimation. Note that this functionality is not critical for the collision avoidance system, and legacy receivers can operate without it.

Since the modes are using most of the reserved bits, and there is some need to have some additional bits (e.g., to signal power step in 802.11ay mode), the LSBs of the Data Length field may be used for this purpose. In all 802.11ay modes, the legacy length bits are only used for NAV computation. By using up to 4 bits for all MCSs (and even more if MSC-1 is excluded), the NAV computation is not affected. The 3 LSB bits of the legacy length are used to signal the power difference between the 802.11ad like part (L-STF, L-CEF, L-Header and EDMG Header) and the Wideband (WB) 802.11ay part (EDMG STF, EDMG CEF and the EDMG data payload) in accordance with the following table:

| Bits | Power difference X [dB] |
|---|---|
| 001 | $X <= 1$ |
| 010 | $1 < X <= 2.5$ |
| 011 | $2.5 < X <= 4$ |
| 100 | $4 < X <= 5.5$ |
| 101 | $5.5 < X <= 7$ |
| 110 | $7 < X <= 8.5$ |
| 111 | $8.5 < X$ |

Frame Format for Short Messages

FIGS. 10A-10D illustrate exemplary frames 1000, 1010, 1020, and 1030 for transmission of short messages in accordance with another aspect of the disclosure. Frame 1000 is an example of a single-channel frame. Frame 1010 is an example of a two-channel frame. Frame 1020 is an example of a three-channel frame. And, frame 1030 is an example of a single-channel frame.

Each channel of the frames include the legacy L-STF, L-CEF, and L-Header. Additionally, each channel of the frames include an EDMG Header with attached data. There is no EDMG data payload in the frames 1000, 1010, 1020, and 1030, as all the data is transmitted via the data attached to the EDMG Header. With regard to the multi-channel frames 1010, 1020, and 1030, the attached data in the EDMG headers may be all the same or different. As previously discussed, the attached data is transmitted via a selected one of a plurality of MCS as specified in the 802.11ad protocol.

Frame Format for Aggregate SC

FIGS. 11A-11D illustrate exemplary frames 1100, 1110, 1120, and 1130 for transmission of an aggregate single carrier (SC) signal in accordance with another aspect of the disclosure. Transmission in aggregate mode is an aggregation of legacy 802.11ad channels. Since the 802.11ay extends the modes of the 802.11ad, there is a need for EDMG Header bits.

The frame formats for both aggregate SC and SC WB (as discussed further herein) are similar in that their first sections (L-STF, L-CEF, L-Header and EDMG Header), and different than the rest of the transmission. The similar part is kept the same since it is backward compatible with 802.11ad for the backward compatibility feature. It means that legacy (802.11ad) devices will be able to detect it and decode the L-Header. As previously discussed, this feature allows legacy devices to update the NAV, which is part of the collision avoidance method. Furthermore, in channel bonded (CB) mode, the L-STF, L-CEF, and L-Header are transmitted on all used channels to facilitate legacy devices on all channels to get the NAV.

The legacy (L-STF+L-CEF+L-Header) and the EDMG Header should be transmitted with the same power across aggregated channels. However, due to RF impairments, actual effective isotropic radiated power (EIRP) may differ. The 802.11ay additional header, aka "EDMG Header" is also transmitted in the 802.11ad channels. As previously discussed, the EDMG Header includes information that is part of the 802.11ay transmission only and also EDMG data may be appended to the same symbol. The following considerations apply: (1) The L-STF and L-CEF apply (no need for additional EDMG CEF); (2) Modulation and coding as defined in the L-Header for 802.11ad Data; (3) Data appended to same symbol to improve overhead for short messages; (4) Data is split across channels in CB mode to improve overhead; and (5) the average power should be kept the same (means that the power of L-STF, L-CEF, L-Header and EDMG Header are same) in each channel.

Frame 1100 case is the extension of 802.11ay for a single channel case. It facilitates the new MCSs of 802.11ay for the EDMG data payload and optional TRN. Frame 1110 is the extension of 802.11ay for the two channel case. Frame 1120 is the extension of 802.11ay for a three channel case. And, Frame 1130 is the extension of 802.11ay for four channel case. The EDMG Header and attached Data are same as described for the SC WB mode, except that there are no Power difference bits, they are added to the "Reserved bits".

There are three implementation options for the aggregate SC: (1) Each channel is independent; (2) all channels are mixed; and (3) all channels are transmitted in parallel. In this first option, each channel is independent. The MCS for the 802.11ay section can be different in each channel. The LDPC blocks are confined to one channel, and each channel has its own blocks. Transmitter may assign different power per channel, but the power shall be fixed for the entire transmission. In this case, the EDMG Header can be different in each channel (e.g., different MCS per channel).

In the second option, all channels are bonded and mixed. The MCS for the 802.11ay section is the same for all channels. The LDPC blocks are spread evenly between the channels. Transmitter may (and should) assign different power per channel to even the detection probability of each channel, but the power shall be fixed during the entire transmission. In this option, the EDMG Header will be same in each channel.

In the third option, the MCS for transmitting data in the EDMG data payload is the same for all aggregate channels. However, each channel has independent encoded (e.g., LDPC) blocks. Each channel is similar and operates in parallel. The transmitter may (and should) assign different power per channel to even the detection probability of each channel, but the power shall be fixed during the entire transmission. The transmitter fills the LDPC blocks one by one sequentially keeping the channel load event. The last LDPC block in some channels (but not all) can be filled with padding. In this option, the EDMG Header will be same in each channel.

Another transmission mode that is similar to aggregate-SC is duplicate-SC. More specifically, in duplicate-SC, the transmission of the aggregate channels is the same as third transmission option of the aggregate-SC with the special restriction that the same data is transmitted in all channels. In other words, each channel is an exact "copy" of the other channel.

Frame Format for MIMO

For MIMO, the legacy preambles (L-STF and L-CEF), along with the EDMG Header are sent in each transmit chain. Similar to 802.11ac, delay is inserted between all transmissions to prevent unintentional beamforming.

For MIMO channel estimation, various techniques may be used in order to estimate the channel, without causing too much latency, and keeping substantially the same SNR. First is the use of delay between the sequences. If this delay is 36.4 ns, then channel estimations can be separated at the receiver since the channel delay is no larger than 64 samples at 1.76 GHz. Second is the transmission of multiple sequences using $P_{HTLTF}$, taken form 802.11mc, section 20.3.9.4.6. Third is the transmission of conjugate vs regular sequence. Forth one is the transmission of multiple sequences using $P_{VHTLTF}$ as defined in 22.3.8.3.5 in 802.11mc. Fifth, is to increase the length of the channel estimation for increased MIMO estimation accuracy. Increasing the length is done using the techniques above (forth technique), with the same Golay sequences. This option avoids the use of conjugated or delay sequence since it doubles the integration time of the channel estimation.

Frame Format for OFDM MIMO

Figure 12:
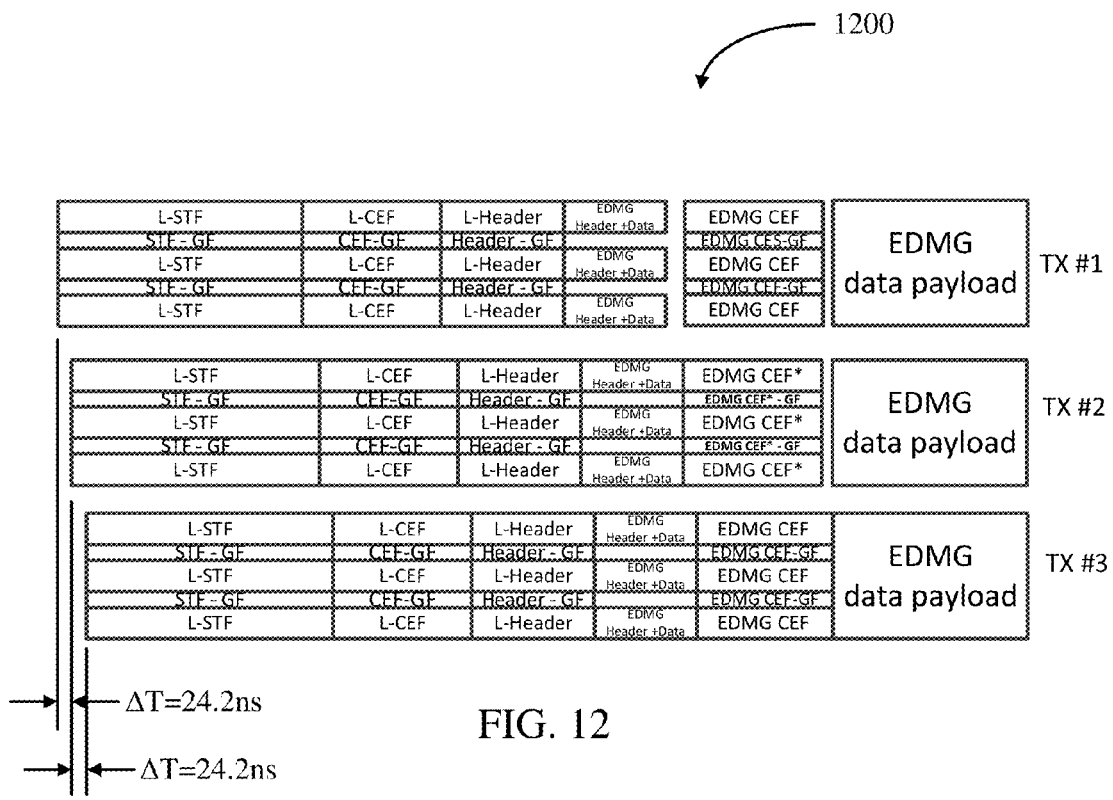
FIG. 12 illustrates an exemplary frame for transmission of data via a plurality (e.g., three (3)) of spatial multiple input multiple output (MIMO) orthogonal frequency division multiplexing (OFDM) transmissions in accordance with certain aspects of the present disclosure.

FIG. 12 illustrates exemplary frames 1200 for transmission of three (3) spatial streams in a MIMO OFDM signal using channel bonding of three (3) in accordance with an aspect of the disclosure. The transmitted preambles (L-STF and L-CEF) and L-Header are transmitted with a delay between them. For the case of MIMO up to 2×2, this delay is used to estimate the MIMO channel by applying the SISO channel estimation sequence of the channel bonding in OFDM. For more than 2 streams, there is a need to include a new channel estimation sequence, which follows the EDMG Header signaling. This channel estimation sequences follow the same format as those for channel bonding, with the additional dimensions added to the estimation using the approaches above. Frame 1200 is an example for channel bonding of 3, and MIMO of 3. As illustrated, the gap-filler sequences can be used also for estimating MIMO channels, by using zero cross-correlation pairs of complex complementary sequences, as illustrated.

Frame Format for WB SC MIMO

Figure 13A:
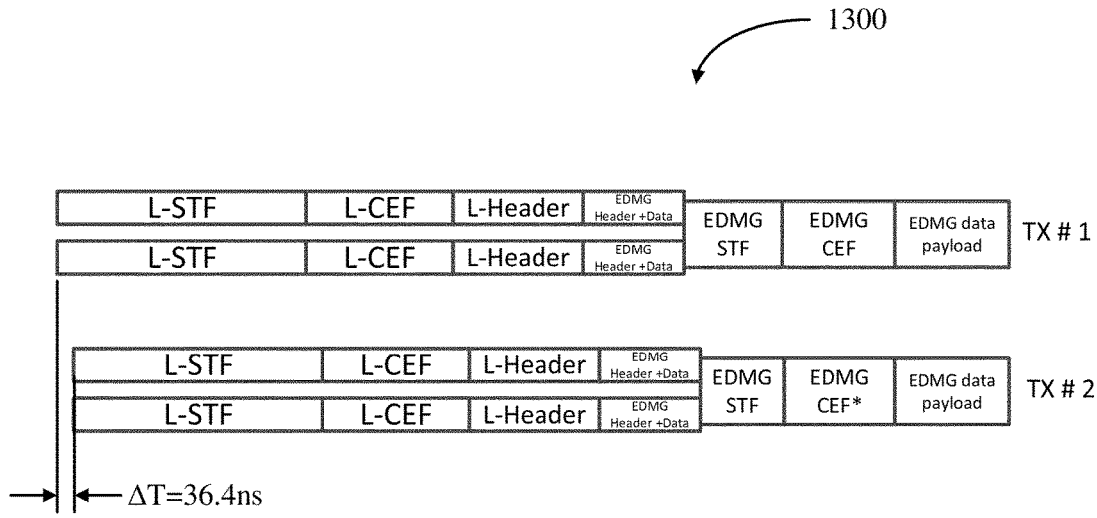
FIGS. 13A-13C illustrate exemplary frames for transmission of data via a plurality (e.g., two (2), four (4), and eight (8)) of spatial multiple input multiple output (MIMO) single carrier wideband (SC WB) transmissions in accordance with certain aspects of the present disclosure.
Figure 13B:
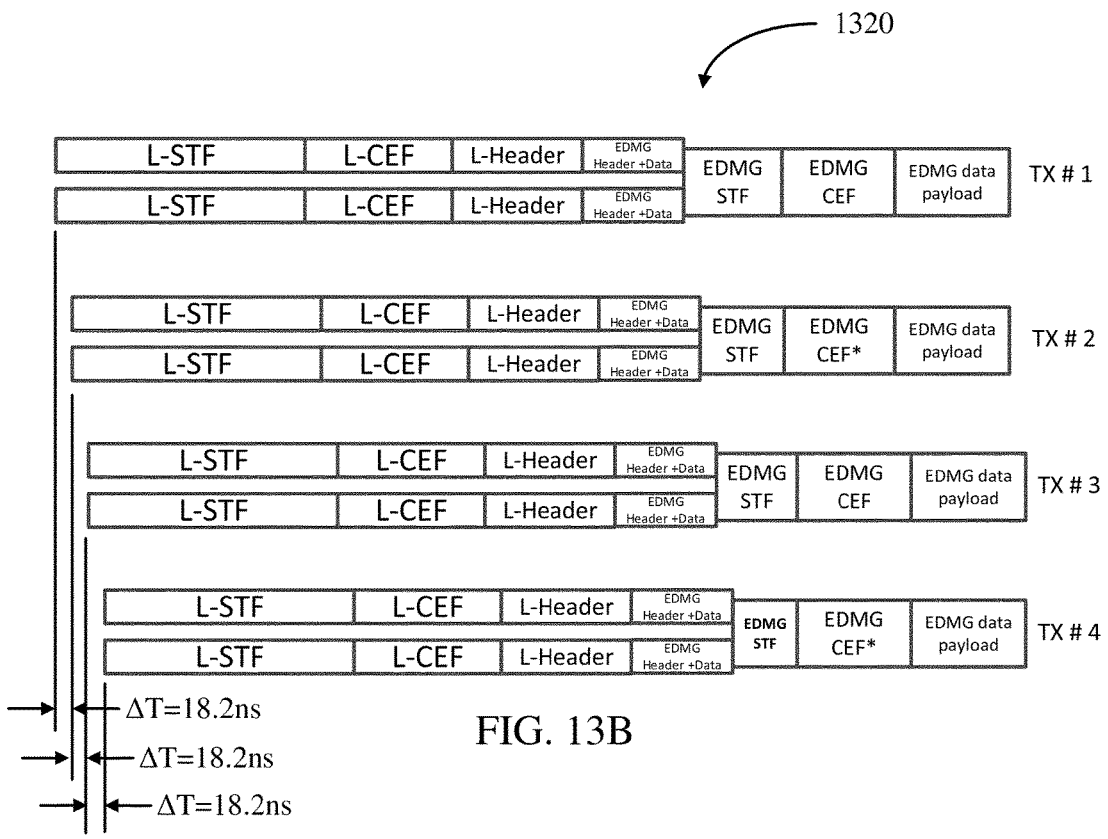
Figure 13C:
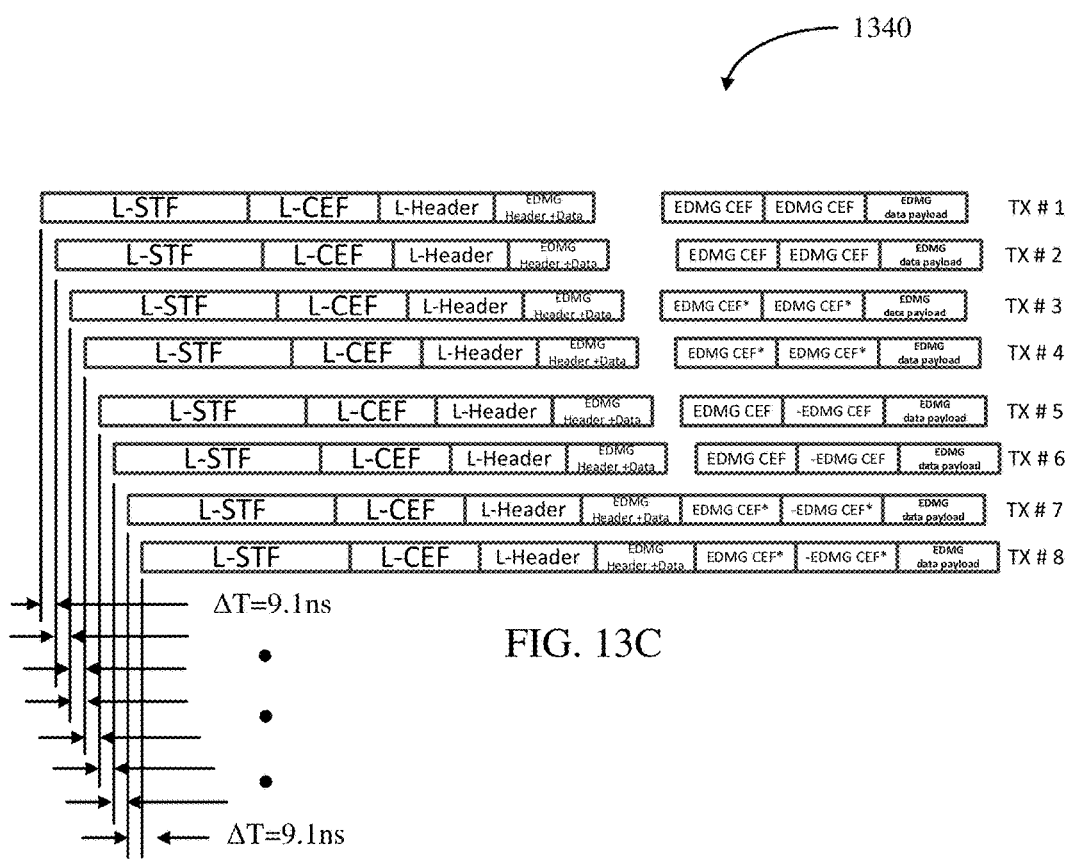

FIGS. 13A-13C illustrate exemplary frames 1300, 1320, and 1340 for transmission of two (2), four (4), and eight (8) spatial streams in a MIMO SC WB signal in accordance with an aspect of the disclosure. For SC WB, the transmission is divided into two stages, before the beginning of the EDMG STF and after it. Before the transmission of the EDMG STF, the MIMO transmission includes the L-STF, L-CEF, L-Header, and the EDMG Header, such that each transmit chain is sending this same signal, just delayed by 64 samples at 1.76 GHz. This is done in order to assure no unintentional beamforming is happening. During the EDMG STF field, all transmitting antennas send the same data. Then, in the EDMG CEF time interval, each antenna is sending different sequences, so to allow the receiver to estimate the entire spatial channel.

Exemplary frame 1300 is an example channel estimation for 2 spatial streams, 2 channel bonding. Exemplary frame 1320 is an example channel estimation for 4 spatial streams, 2 channel bonding. Exemplary frame 1340 is an example channel estimation for 8 spatial streams, single channel.

Frame Format for Aggregate SC MIMO

Figure 14A:
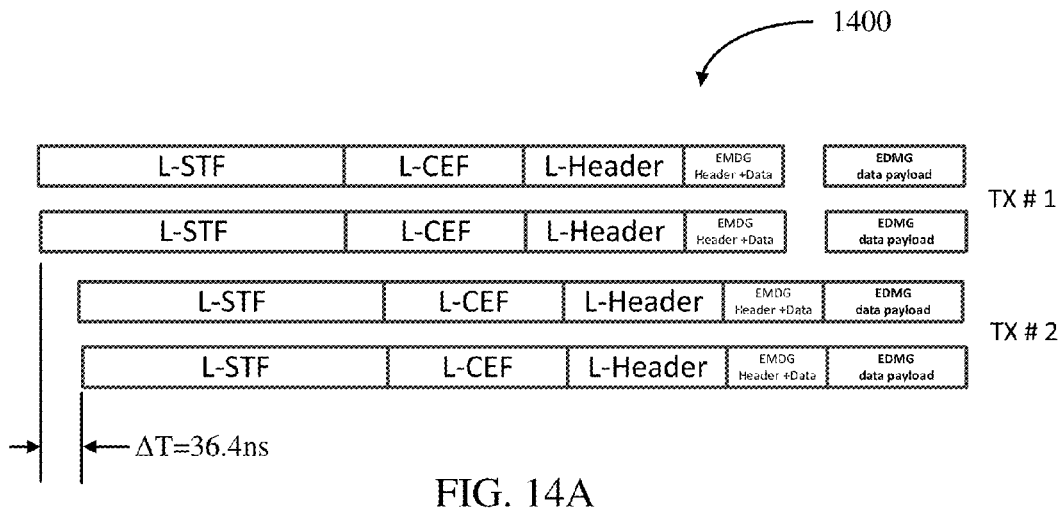
FIGS. 14A-14B illustrate exemplary frames for transmission of data via a plurality (e.g., two (2) and three (3)) of spatial multiple input multiple output (MIMO) aggregated single carrier (SC) transmissions in accordance with certain aspects of the present disclosure.
Figure 14B:
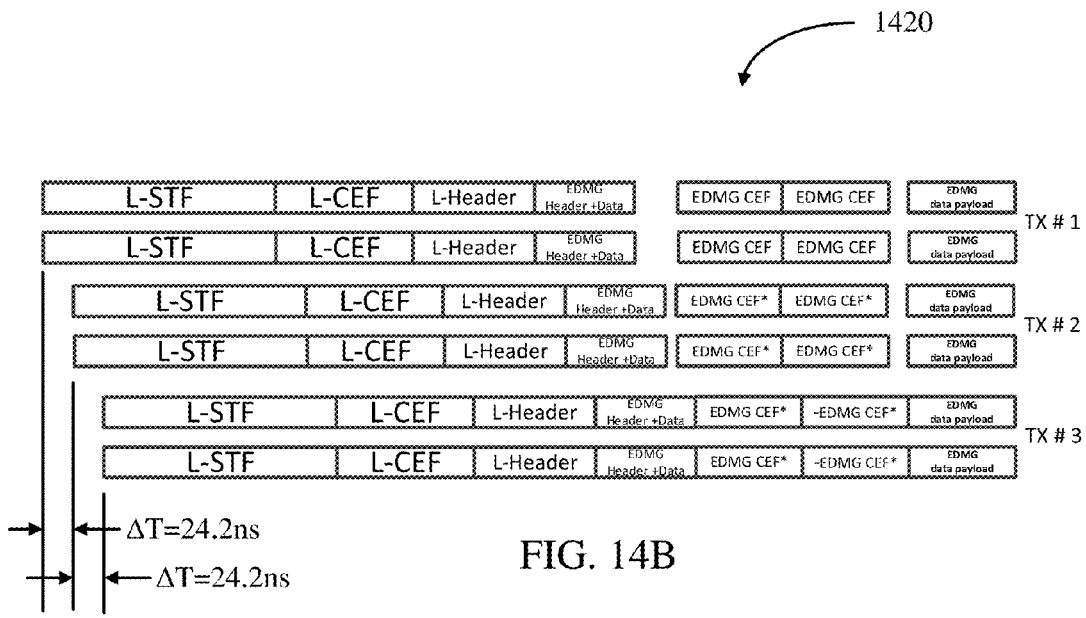

FIGS. 14A-14B illustrate exemplary frames 1400 and 1420 for transmission of two (2) and three (3) spatial streams in a MIMO aggregate SC signal in accordance with another aspect of the disclosure. MIMO aggregate SC uses the same technique as the SC-WB mode, i.e., the three methods, with the difference of the channel estimation in the gap between the band not being transmitted (which is not MIMO related anyway), so the basic sequences are 802.11ad CEF sequences transmitted multiple times.

Exemplary frame 1400 is an example is given below for the 2 channel with 2 MIMO. Then there is no need for adding additional CEF sequence, because the MIMO channel estimation is done using the L-CEF of the legacy preamble. Exemplary frame 1420 is another example for the case of 3 channel with 3 MIMO, then additional sequences are needed in order to estimate the channel. The proposed sequences are like the one used for the SC WB above.

FIG. 15A illustrates a block diagram an exemplary apparatus 1500 (e.g., transmitter portion) for generating the L-CEF and CEF-GF portions of various frames previously described. In particular, the apparatus 1500 is configured for generating the L-CEF and CEF-GF portion for a frame comprising a bonded channel of two. The apparatus 1500 may be implemented in any processing system described herein.

More specifically, the apparatus 1500 comprises an input L-CEF sequence source 1510, a first interpolation device 1515, a first modulator 1520, and a second modulator 1525. The apparatus 1500 further comprises an input CEF-GF sequence source 1550 and a second interpolation device 1555. Additionally, the apparatus 1500 comprises a combiner 1570.

The L-CEF sequence source 1510 is configured to generate an input L-CEF sequence, which may be specified in the IEEE 802.11ad protocol. For example, such input L-CEF sequence may be based on Golay sequences, such as $G_{U512}$, $G_{V512}$, and $G_{V128}$, as specified in the IEEE 802.11ad protocol. The first interpolation device 1515 is configured to up-sample and filter the input L-CEF sequence to generate an intermediate L-CEF sequence that has a bandwidth of substantially 1.76 GHz and a delay spread of 72.72 ns, and desired passband and rejection specification, such as exemplified in FIGS. 15D-15E. The first interpolation device 1515 may be configured to up-sample the input L-CEF sequence by an up-sampling ratio of 1:4.5. The first modulator 1520 shifts the intermediate L-CEF sequence in frequency by an amount of substantially −1.08 GHz to properly place the resultant L-CEF sequence in a first (lower) channel. Similarly, the second modulator 1525 shifts the intermediate L-CEF sequence in frequency by an amount of substantially +1.08 GHz to properly place the resultant L-CEF sequence in a second (upper) channel.

The CEF-GF sequence source 1550 is configured to generate an input CEF-GF sequence, which may be based on a Golay sequence. For example, as previously discussed, the input CEF-GF may be optionally based on a 32-length Golay sequence specified in the IEEE 802.11ad protocol, or optionally based on a 20-length Golay sequence, or optionally based on a 26-length Golay sequence. The second interpolation device 1555 is configured to up-sample and filter the input CEF-GF sequence to generate a resultant CEF-GF sequence that has a bandwidth of substantially 400 MHz and a delay spread of substantially 72.72 ns, and desired passband and rejection specification, such as exemplified in FIGS. 15D-15E. The second interpolation device 1555 may be configured to up-sample the input CEF-GF sequence by an up-sampling ratio of 1:27.

The combiner 1570 combines the resultant L-CEF sequences generated at the output of the first and second modulators 1520 and 1525, and the resultant CEF-GF generated at the output of the second interpolation device 1555, to generate the portion of a frame comprising an L-CEF sequence for transmission via first and second channels, and the CEF-GF via the GF channel situated in frequency between the first and second channels. The output of the combiner 1570 may be provided to a digital-to-analog (DAC) converter for generating the corresponding analog portion of the frame.

FIG. 15B illustrates a block diagram an exemplary apparatus 1502 (e.g., transmitter portion) for generating the L-CEF and CEF-GF portions of various frames previously described. In particular, the apparatus 1502 is configured for generating the L-CEF and CEF-GF portion for a frame comprising a bonded channel of three. The apparatus 1502 may be implemented in any processing system described herein.

The apparatus 1502 includes some of the same elements as the apparatus 1500 including the input L-CEF sequence source 1510, the first interpolation device 1515, the input CEF-GF sequence source 1550, the second interpolation device 1555, and the combiner 1570. Additionally, the apparatus 1502 comprises first modulator 1522, second modulator 1527, third modulator 1560, and fourth modulator 1565.

The L-CEF sequence source 1510 is configured to generate an input L-CEF sequence, as previously discussed. The first interpolation device 1515 is configured to up-sample and filter the input L-CEF sequence to generate an intermediate L-CEF sequence that has a bandwidth of substantially 1.76 GHz and a delay spread of 72.72 ns, and desired passband and rejection specification, as previously discussed. The first modulator 1522 shifts the intermediate L-CEF sequence in frequency by an amount of substantially −2.16 GHz to properly place the resultant L-CEF sequence in a first (lower) channel. Similarly, the second modulator 1527 shifts the intermediate L-CEF sequence in frequency by an amount of substantially +2.16 GHz to properly place the resultant L-CEF sequence in a third (upper) channel. The intermediate L-CEF sequence need not be frequency shifted as it is already configured for transmission via the second (middle) channel between the first and second channels.

The CEF-GF sequence source 1550 is configured to generate an input CEF-GF sequence, as previously discussed. The second interpolation device 1555 is configured to up-sample and filter the input CEF-GF sequence to generate a resultant CEF-GF sequence that has a bandwidth of substantially 400 MHz and a delay spread of substantially 72.72 ns, as previously discussed. The third modulator 1560 shifts the intermediate CEF-GF sequence in frequency by an amount of substantially −1.08 GHz to properly place the resultant CEF-GF sequence in a first (lower) GF channel situated in frequency between the first and second channels. Similarly, the fourth modulator 1565 shifts the intermediate CEF-GF sequence in frequency by an amount of substantially +1.08 GHz to properly place the resultant CEF-GF sequence in a second (upper) GF channel situated in frequency between the second and third channels.

The combiner 1570 combines the resultant L-CEF sequences generated at the output of the first and second modulators 1522 and 1527 and the output of the first interpolation device 1515, and the resultant CEF-GF generated at the output of the third and fourth modulators 1560 and 1565 to generate the portion of a frame comprising an L-CEF sequence for transmission via first, second, and third channels, and the CEF-GF sequence for transmission via first and second GF channels situated in frequency between the first and second channels, and the third and fourth channels, respectively. The output of the combiner 1570 may be provided to a digital-to-analog (DAC) converter for generating the corresponding analog portion of the frame.

FIG. 15C illustrates a block diagram an exemplary apparatus 1504 (e.g., transmitter portion) for generating the L-CEF and CEF-GF portions of various frames previously described. In particular, the apparatus 1504 is configured for generating the L-CEF and CEF-GF portions for a frame comprising a bonded channel of four. The apparatus 1504 may be implemented in any processing system described herein.

The apparatus 1504 includes some of the same elements as the apparatuses 1500 and 1502, including the input L-CEF sequence source 1510, the first interpolation device 1515, the input CEF-GF sequence source 1550, the second interpolation device 1555, the first modulator 1520, the second modulator 1525, and the combiner 1570. Additionally, the apparatus 1504 comprises a third modulator 1524, a fourth modulator 1529, a fifth modulator 1562, and a sixth modulator 1567.

The L-CEF sequence source 1510 is configured to generate an input L-CEF sequence, as previously discussed. The first interpolation device 1515 is configured to up-sample and filter the input L-CEF sequence to generate an intermediate L-CEF sequence that has a bandwidth of substantially 1.76 GHz and a delay spread of 72.72 ns, and desired passband and rejection specification, as previously discussed. The first modulator 1520 shifts the intermediate L-CEF sequence in frequency by an amount of substantially −1.08 GHz to properly place the resultant L-CEF sequence in a second channel. Similarly, the second modulator 1525 shifts the intermediate L-CEF sequence in frequency by an amount of substantially +1.08 GHz to properly place the resultant L-CEF sequence in a third channel. The third modulator 1524 shifts the intermediate L-CEF sequence in frequency by an amount of substantially −3.24 GHz to properly place the resultant L-CEF sequence in a first channel. Similarly, the fourth modulator 1529 shifts the intermediate L-CEF sequence in frequency by an amount of substantially +3.24 GHz to properly place the resultant L-CEF sequence in a fourth channel.

The CEF-GF sequence source 1550 is configured to generate an input CEF-GF sequence, as previously discussed. The second interpolation device 1555 is configured to up-sample and filter the input CEF-GF sequence to generate a resultant CEF-GF sequence that has a bandwidth of substantially 400 MHz and a delay spread of substantially 72.72 ns, as previously discussed. The fifth modulator 1562 shifts the intermediate CEF-GF sequence in frequency by an amount of substantially −2.16 GHz to properly place the resultant CEF-GF sequence in a first (lower) GF channel situated in frequency between the first and second channels. Similarly, the sixth modulator 1567 shifts the intermediate CEF-GF sequence in frequency by an amount of substantially +2.16 GHz to properly place the resultant CEF-GF sequence in a third (upper) GF channel situated in frequency between the third and fourth channels. The intermediate CEF-GF sequence need not be frequency shifted as it is already configured for transmission via a second (middle) GF channel situated the second and third channels.

The combiner 1570 combines the resultant L-CEF sequences generated at the output of the first, second, third, and fourth modulators 1520, 1525, 1524, and 1529, the resultant CEF-GF generated at the output of the fifth and sixth modulators 1562 and 1567, and the CEF-GF generated at the output of the second interpolation device 1555 to generate the portion of a frame comprising an L-CEF sequence for transmission via first, second, third, and fourth channels, and the CEF-GF sequence for transmission via first, second, and third GF channels situated in frequency between the first and second channels, the second and third channels, and the third and fourth channels, respectively. The output of the combiner 1570 may be provided to a digital-to-analog (DAC) converter for generating the corresponding analog portion of the frame.

Figure 15D:
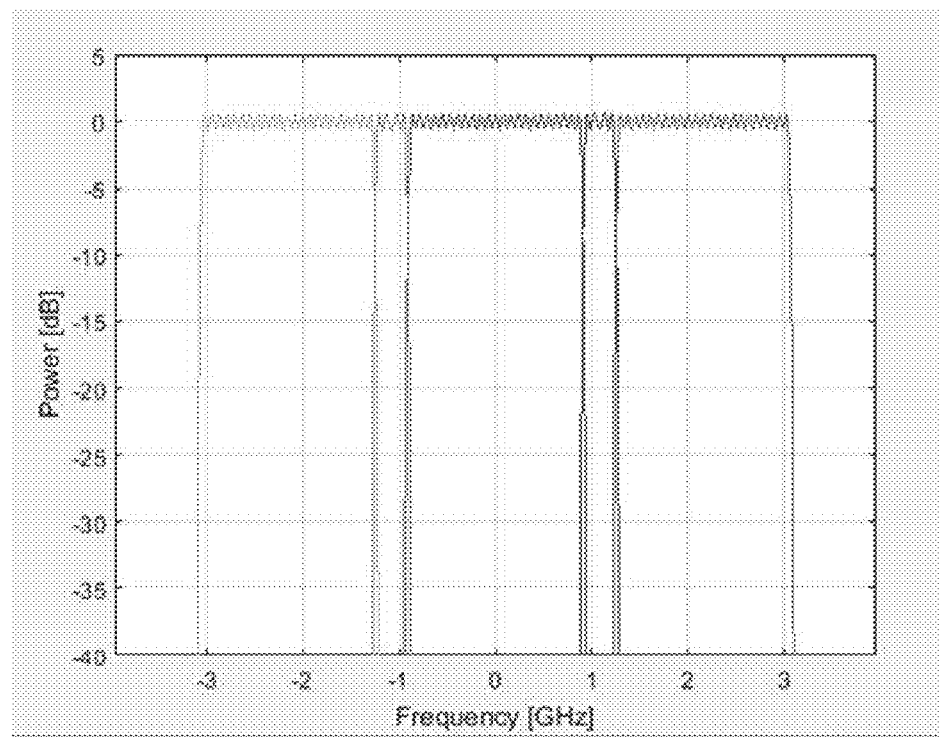
FIGS. 15D-15E illustrate diagrams of an exemplary frequency spectrum associated with the L-CEF|CEF-GF|L-CEF portion of certain frames described herein.
Figure 15E:
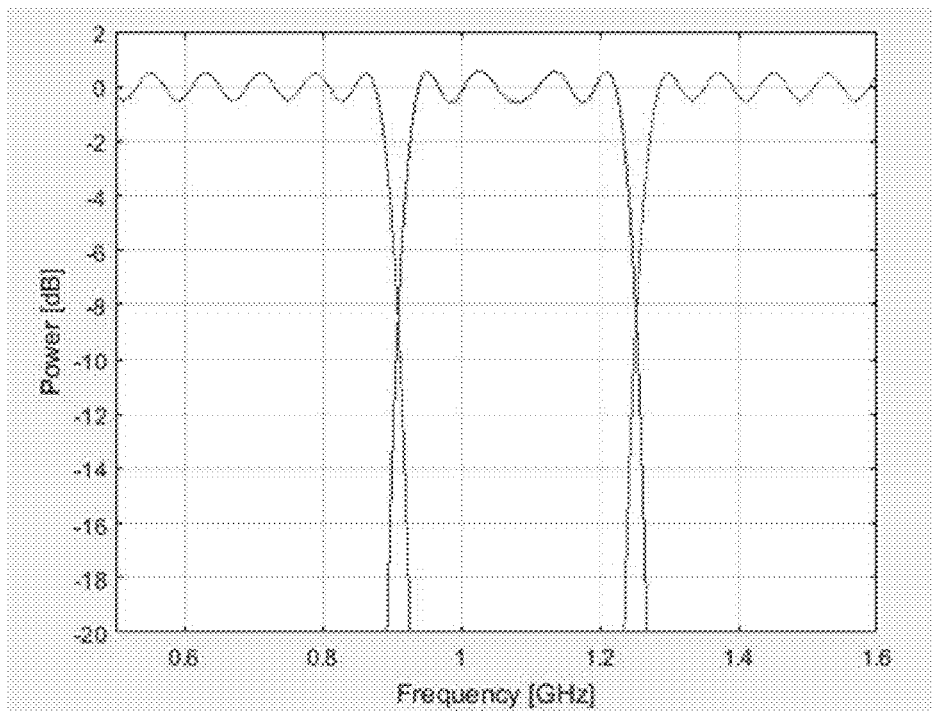

FIG. 15D-15E illustrate diagrams of an exemplary frequency spectrum of the L-CEF|CEF-GF|L-CEF portion of any of the frames 420, 440, 460, 700, 720, and 740 previously discussed. In particular, FIG. 15D illustrates a wider frequency view of the frequency response associated with the L-CEF, CEF-GF, and L-CEF. And, FIG. 15E illustrates a narrow frequency view of the frequency response associated with the L-CEF, CEF-GF, and L-CEF. The exemplary frequency response may pertain to a frame that includes a channel bonding of two.

As illustrated in FIG. 15D, the passband of the frequency bands associated with the L-CEF, CEF-GF, and L-CEF has some ripple (e.g., <1 dB ripple) that may be taken into account by a receiver in determining or generating a channel estimation for a frequency band of a corresponding bonded channel. The frequency band of the corresponding bonded channel at least overlaps with the frequency bands associated with the L-CEF, CEF-GF, and L-CEF. Or, alternatively, a lower end of the frequency band for the bonded channel may substantially coincide in frequency with a lower end of the first channel and an upper end of the frequency band for the bonded channel may substantially coincide in frequency with an upper end of the second channel.

With particular attention to FIG. 15E, the filters implemented in the interpolation devices for generating the frame corresponding to the exemplary frequency response may be configured to provide a rejection of 7 dB or more at the intersection of the frequency bands associated with the first channel L-CEF and CEF-GF, and the CEF-GF and the second channel L-CEF. As previously discussed, the filters may be implemented as Kaiser window based filters with over 200 taps, or other implementation.

Figure 15F:
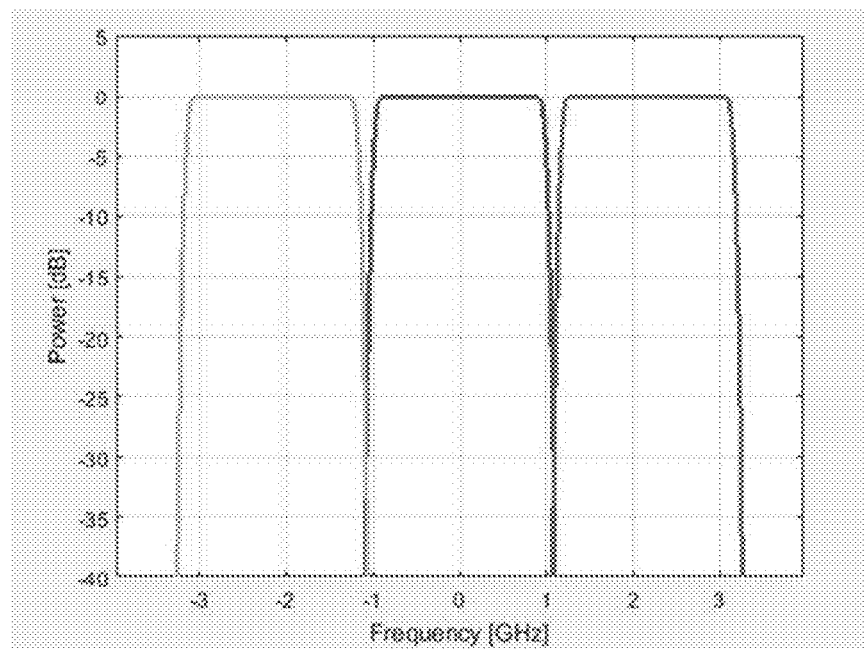
FIG. 15F illustrates diagrams of the frequency spectrum associated with the L-CEF||L-CEF||L-CEF portion of certain frames described herein.

FIG. 15F illustrates diagrams of exemplary frequency spectrum of L-CEF∥L-CES∥L-CEF portion of any of the frames 500, 520, 540, 800, 820, and 840 previously discussed. Although, in this example, the exemplary frequency spectrum pertains more specifically to the L-CEF of three (3) legacy channels, it as shall be understood that similar frequency spectrum applies to the L-CEF of two (2) channels (with one channel removed and centered at zero (0) Frequency), and four (4) channels (with one channel added and centered at zero (0) Frequency).

As illustrated, the passband of each of the L-CEF frame portion is substantially 1.76 GHz and relatively flat based on the selected filter. Since, during the L-CEF portion of the frame, there is no signal centered on the GF frequency band, the overlap between frequency bands of adjacent L-CEF channels occur at −17 dB or greater. Because of the absence of the GF signal at this portion of the frame, the filter requirements for the L-CEF may be relaxed as compared to the filter requirement of the L-CEF|CEF-GF|L-CEF portion of frames 420, 440, 460, 700, 720, and 740.

Figure 15G:
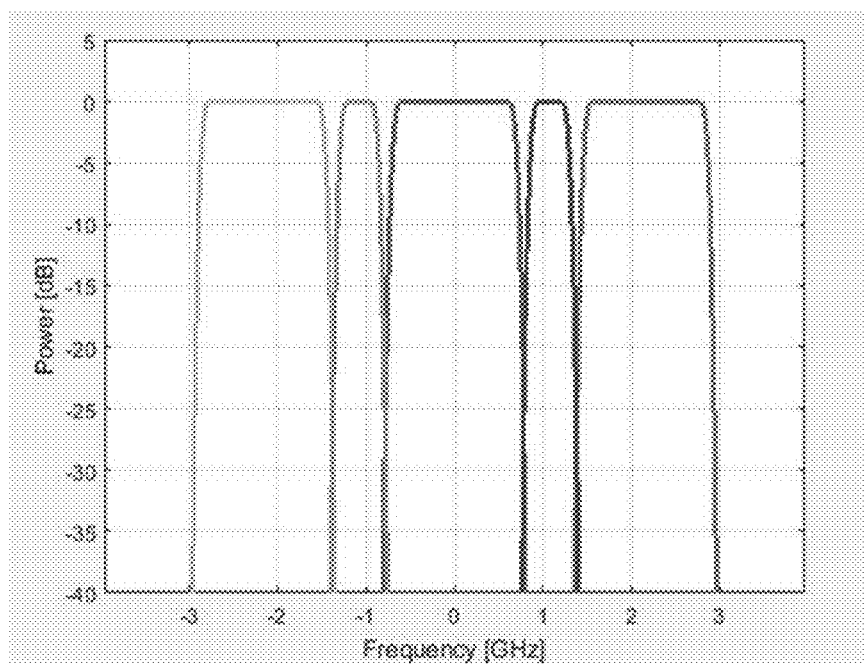
FIG. 15G illustrate diagrams of the frequency spectrum associated with the L-Header|CEF-GF|L-Header|CEF-GF|L-Header portion of certain frames described herein.

FIG. 15F-15G illustrate diagrams of the frequency response of the frequency bands associated with the L-Header|CEF-GF|L-Header|CEF-GF|L-Header portion of any of the frames 500, 520, 540, 800, 820, and 840 previously discussed. Similarly, although, in this example, the exemplary frequency spectrum pertains more specifically to the L-CEF|CEF-GF portion of three (3) legacy channel frame, it as shall be understood that similar frequency spectrum applies to the L-CEF|CEF-GF portion of a two (2) channel frame (with one set of L-CEF|CEF-GF channels removed and centered at zero (0) Frequency), and four (4) channels (with one set of L-CEF|CEF-GF channels added and centered at zero (0) Frequency).

As illustrated, the passband of each of the L-Header frame portion is approximately 1.3-1.5 GHz, less than the bandwidth 1.76 GHz of the corresponding channel. As discussed, this also relaxes the requirements of the filter associated with the CEF-GF portion of the frame. Also, as illustrated, the passband of the L-Header portion is configured relatively flat based on the selected filter.

The passband of each of the CEF-GF frame portion is substantially 400 MHz or slightly more because of the frequency narrowing of the L-Header portions of the frame. The passband of each of the CEF-GF frame portion is also relatively flat based on the selected filter. As illustrated, the overlap between frequency bands of the L-Header and CEF-GF portion occur at −17 dB or greater.

Figure 16:
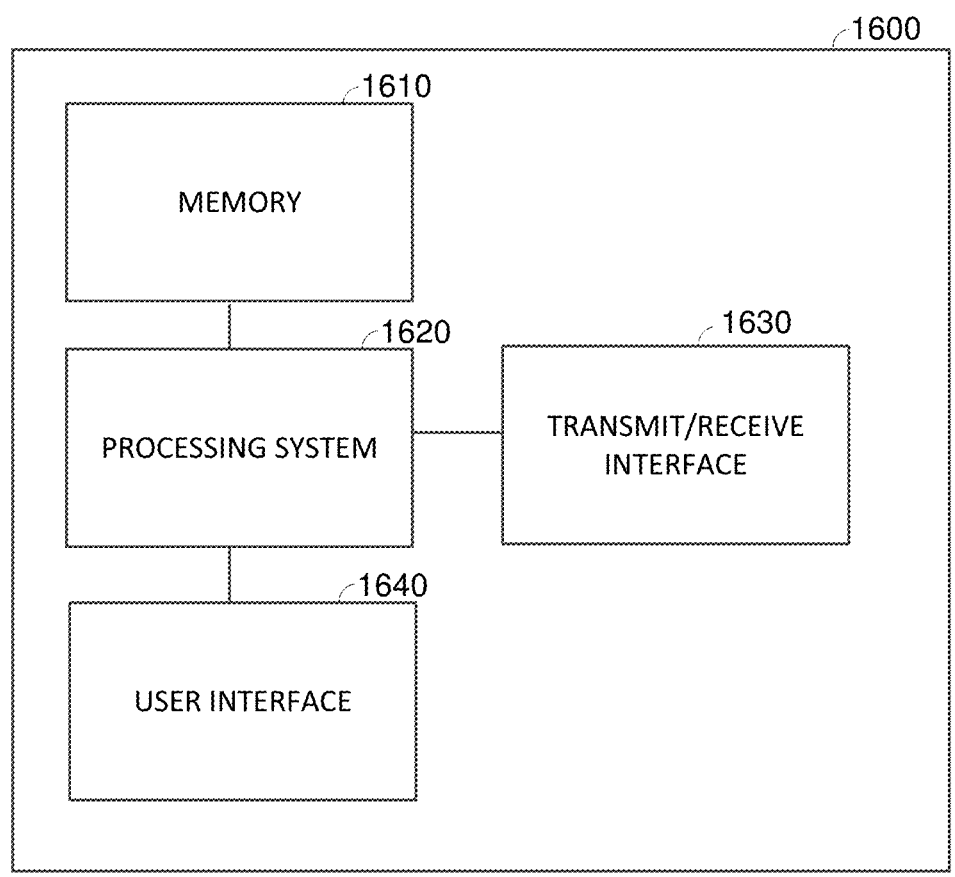
FIG. 16 illustrates a block diagram of an exemplary device in accordance with certain aspects of the present disclosure.

FIG. 16 illustrates an example device 1600 according to certain aspects of the present disclosure. The device 1600 may be configured to operate in an access point (e.g., access point 210) or an access terminal (e.g., access terminal) and to perform one or more of the operations described herein. The device 1600 includes a processing system 1620, and a memory 1610 coupled to the processing system 1620. The memory 1610 may store instructions that, when executed by the processing system 1620, cause the processing system 1620 to perform one or more of the operations described herein. Exemplary implementations of the processing system 1620 are provided below. The device 1600 also comprises a transmit/receiver interface 1630 coupled to the processing system 1620. The interface 1630 (e.g., interface bus) may be configured to interface the processing system 1620 to a radio frequency (RF) front end (e.g., transceiver 226-1 to 226-N, 266), as discussed further below.

In certain aspects, the processing system 1620 may include one or more of the following: a transmit data processor (e.g., transmit data processor 220 or 260), a frame builder (e.g., frame builder 222 or 262), a transmit processor (e.g., transmit processor 224 or 264) and/or a controller (e.g., controller 234 or 274) for performing one or more of the operations described herein. In these aspects, the processing system 1620 may generate a frame and output the frame to an RF front end (e.g., transceiver 226 or 266) via the interface 1630 for wireless transmission (e.g., to an access point or an access terminal).

In certain aspects, the processing system 1620 may include one or more of the following: a receive processor (e.g., receive processor 242 or 282), a receive data processor (e.g., receive data processor 244 or 284) and/or a controller (e.g., controller 234, 274) for performing one or more of the operations described herein. In these aspects, the processing system 1620 may receive a frame from an RF front end (e.g., transceiver 226-1 to 226-N, 266,) via the interface 1630 and process the frame according to any one or more of the aspects discussed above.

In the case of an access terminal 250, the device 1600 may include a user interface 1640 coupled to the processing system 1620. The user interface 1640 may be configured to receive data from a user (e.g., via keypad, mouse, joystick, etc.) and provide the data to the processing system 1620. The user interface 1640 may also be configured to output data from the processing system 1620 to the user (e.g., via a display, speaker, etc.). In this case, the data may undergo additional processing before being output to the user. In the case of an access point 210, the user interface 1640 may be omitted.

The processing system 1620, frame builder 222, and/or frame builder 262 are examples of means for generating a frame including any or all components of the frame, such as an L-STF, L-CEF, L-Header, EDMG Header including optional attached data, EDMG data payload or portions thereof, STF-GF, CEF-GF, OFDM CEF-GF and variations thereof (e.g., OFDM CEF-GF*, etc.), EDMG STF, and EDMG CEF and variations thereof (e.g., EDMG CEF*, etc.). Additionally, the processing system 1620, frame builder 222, frame builder 262, interpolation devices 1515 and/or 1555 are examples of means for up-sampling first and/or second input channel estimation sequences. Similarly, the processing system 1620, frame builder 222, frame builder 262, and/or modulators 1520, 1525, 1522, 1527, 1560, 1565, 1524, 1529, 1562, and 1567 are examples of means for generating the first and/or second channel estimation sequences by frequency shifting the first and/or second channel estimation sequences. Further, the transmit/ receive interface 1630, the transmit processor 224, and transmit processor 264 are examples of means for outputting a frame for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It shall be understood that the processing as described herein may be performed by any digital means as discussed above, and or any analog means or circuitry.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of an access terminal 220 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
    a processing system configured to generate a frame comprising a first channel estimation sequence for transmission via a first channel, a second channel estimation sequence for transmission via a second channel, at least a first portion of a data payload for transmission via a third channel, and a first header including a second portion of the data payload, wherein the first channel includes a first frequency band, wherein the second channel includes a second frequency band different from the first frequency band, and wherein the third channel includes a third frequency band that overlaps in frequency with the first and second frequency bands; and
    an interface configured to output the frame for transmission.

2. The apparatus of claim 1, wherein the processing system is configured to generate the frame such that at least a portion of the first channel estimation sequence is configured for transmission at the same time as at least a portion of the second channel estimation sequence.

3. The apparatus of claim 1, wherein the processing system is configured to generate the frame such that beginning and ending of the first channel estimation sequence are configured for transmission at substantially the same time as beginning and ending of the second channel estimation sequence.

4. The apparatus of claim 1, wherein the processing system is configured to generate the frame such that the first channel estimation sequence is configured to be decoded by a first device operating in accordance with a first protocol, and the first and second channel estimation sequences are configured to be decoded by a second device operating in accordance with a second protocol.

5. The apparatus of claim 1, wherein the processing system is configured to generate the frame such that the first header is configured for transmission via the first channel.

6. The apparatus of claim 1, wherein the processing system is configured to generate the frame such that at least a portion of the first header is configured to be transmitted at the same time as at least a portion of the second channel estimation sequence.

7. The apparatus of claim 1, wherein the processing system is configured to generate the frame such that a beginning and an ending of the second channel estimation sequence are configured to be transmitted before a beginning and after an ending of the first header, respectively.

8. The apparatus of claim 1, wherein the processing system is configured to generate the frame such that the first channel estimation sequence is configured to be decoded by a first device operating in accordance with a first protocol, and the first header and the second channel estimation sequence are configured to be decoded by a second device operating in accordance with a second protocol.

9. The apparatus of claim 1, wherein the processing system is configured to generate the frame such that a frequency gap exists between the first and second frequency bands.

10. The apparatus of claim 1, wherein the processing system is configured to generate the frame to include a second header including a third portion of the data payload, wherein the first and second headers are configured for transmission via the first and second channels, respectively.

11. The apparatus of claim 1, wherein the processing system is configured to generate the frame such that the first header is configured to be transmitted at the same time as at least a portion of the second channel estimation sequence.

12. The apparatus of claim 1, wherein the processing system is configured to generate the frame such that beginning and ending of the first header are configured to be transmitted substantially at the same time as beginning and ending of the second channel estimation sequence, respectively.

13. The apparatus of claim 1, wherein the processing system is configured to generate the frame such that the first channel estimation sequence is configured to be decoded by a first device operating in accordance with a first protocol, and the first header and the first and second channel estimation sequences are configured to be decoded by a second device operating in accordance with a second protocol.

14. The apparatus of claim 1, wherein the processing system is configured to generate the frame such that the first header and the second channel estimation sequence are configured for orthogonal frequency division multiplexing (OFDM) transmission.

15. The apparatus of claim 1, wherein the processing system is configured to generate the frame such that the at least first portion of the data payload is configured for orthogonal frequency division multiplexing (OFDM) transmission.

16. The apparatus of claim 1, wherein the processing system is configured to generate the frame such that the at least first portion of the data payload is configured for transmission via a single carrier signal.

17. The apparatus of claim 1, wherein the processing system is configured to generate the frame such that the frame further comprises a third channel estimation sequence for transmission via a fourth channel, wherein the fourth channel includes a fourth frequency band different than the first and second frequency bands.

18. The apparatus of claim 17, wherein the third frequency band of the third channel overlaps in frequency with the first, second, and fourth frequency bands.

19. The apparatus of claim 17, wherein a first end of the third frequency band substantially coincides in frequency with an end of the first frequency band, and wherein a second end of the third frequency band substantially coincides in frequency with an end of the fourth frequency band.

20. The apparatus of claim 1, wherein the first channel estimation sequence comprises a first Golay sequence, and wherein the second channel estimation sequence comprises a second Golay sequence.

21. The apparatus of claim 1, wherein the processing system comprises:

a first interpolation device configured to up-sample a first input channel estimation sequence to generate a first intermediate channel estimation sequence with a first length and a first bandwidth;
a first modulator configured to generate the first channel estimation sequence by frequency shifting the first intermediate channel estimation sequence; and
a second interpolation device configured to up-sample a second input channel estimation sequence to generate the second channel estimation sequence with a second length and a second bandwidth or a second intermediate channel estimation sequence with the first length and the second bandwidth.

22. The apparatus of claim 21, wherein the processing system further comprises a second modulator configured to generate the second channel estimation sequence by frequency shifting the second intermediate channel estimation sequence.

23. A method for wireless communications, comprising:
generating a frame comprising a first channel estimation sequence for transmission via a first channel, a second channel estimation sequence for transmission via a second channel, at least a first portion of a data payload for transmission via a third channel, and a header including a second portion of the data payload, wherein the first channel includes a first frequency band, wherein the second channel includes a second frequency band different from the first frequency band, and wherein the third channel includes a third frequency band that overlaps in frequency with the first and second frequency bands; and
outputting the frame for transmission.

24. A wireless node, comprising:
at least one antenna;
a processing system configured to generate a frame comprising a first channel estimation sequence for transmission via a first channel, a second channel estimation sequence for transmission via a second channel, at least a first portion of a data payload for transmission via a third channel, and a header including a second portion of the data payload, wherein the first channel includes a first frequency band, wherein the second channel includes a second frequency band different from the first frequency band, and wherein the third channel includes a third frequency band that overlaps in frequency with the first and second frequency bands; and
a transmitter configured to transmit the frame via the at least one antenna.

* * * * *